United States Patent
Fukuda

(10) Patent No.: US 7,514,169 B2
(45) Date of Patent: Apr. 7, 2009

(54) FUEL CELL SYSTEM

(75) Inventor: Takashi Fukuda, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 595 days.

(21) Appl. No.: 11/179,601

(22) Filed: Jul. 13, 2005

(65) Prior Publication Data

US 2006/0019137 A1 Jan. 26, 2006

(30) Foreign Application Priority Data

Jul. 23, 2004 (JP) ............................. 2004-215807

(51) Int. Cl.
*H01M 8/04* (2006.01)
*B60K 1/00* (2006.01)
(52) U.S. Cl. ....................... 429/25; 180/65.3
(58) Field of Classification Search .................. 429/25; 180/65.3
See application file for complete search history.

(56) References Cited

U.S. PATENT DOCUMENTS 5,965,228 A * 10/1999 Kugler ...................... 428/64.1
5,965,288 A * 10/1999 Okamoto .................... 429/26
7,058,549 B2 * 6/2006 Gysling et al. .............. 702/189
2004/0101725 A1 * 5/2004 Kato et al. .................... 429/24
2004/0226386 A1 * 11/2004 Gysling et al. ........... 73/861.42

FOREIGN PATENT DOCUMENTS

JP 2002-183113 A 6/2002

OTHER PUBLICATIONS

Perry, R.H.; Green, D.W. (1997). Perry's Chemical Engineers' Handbook (7th Edition). McGraw-Hill. Online version available at:http://www.knovel.com/knovel2/Toc.jsp?BookID=48&VerticalID=0.*

* cited by examiner

*Primary Examiner*—Patrick Ryan
*Assistant Examiner*—Muhammad Siddiquee
(74) *Attorney, Agent, or Firm*—Foley & Lardner LLP

(57) ABSTRACT

A fuel cell system has: a water supply cycle for supplying water to a fuel cell stack through piping; n numbers of pressure detection devices (n is an even number of two or greater) provided on the piping and detecting pressure of the water; and a control device for determining a pressure anomaly of the water within the piping by comparing a predetermined anomaly determination value to a pressure calculated value obtained by calculation of pressure values detected by the n numbers of pressure detection devices, the calculation including at least addition. In the fuel cell system, if a center point of the piping is divided into n numbers of equal parts by axis lines and one of the axis lines is set as an axis line of a reference pressure detection device, the other pressure detection device is provided within an angle range of ±360/2n degrees about the other axis line.

28 Claims, 16 Drawing Sheets

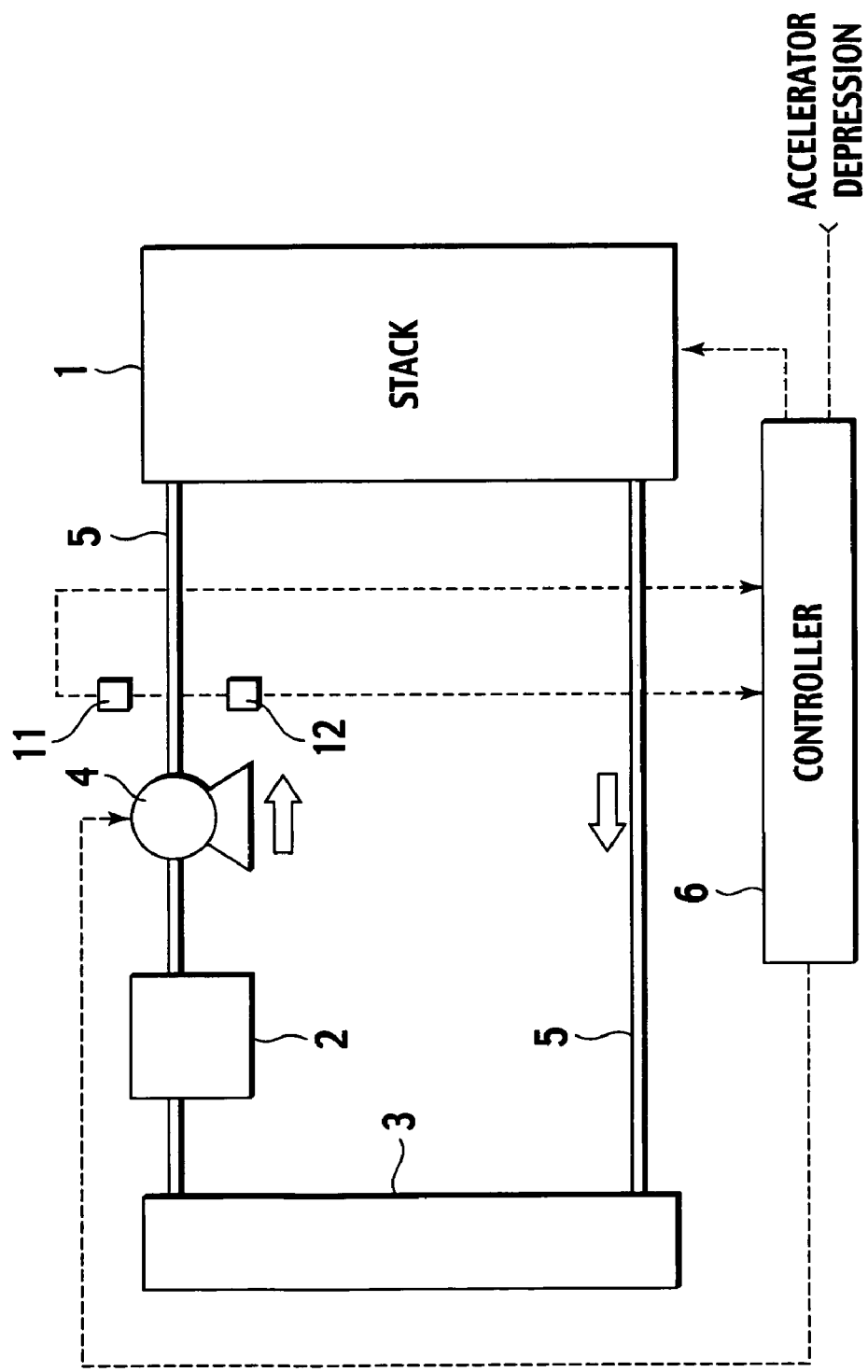

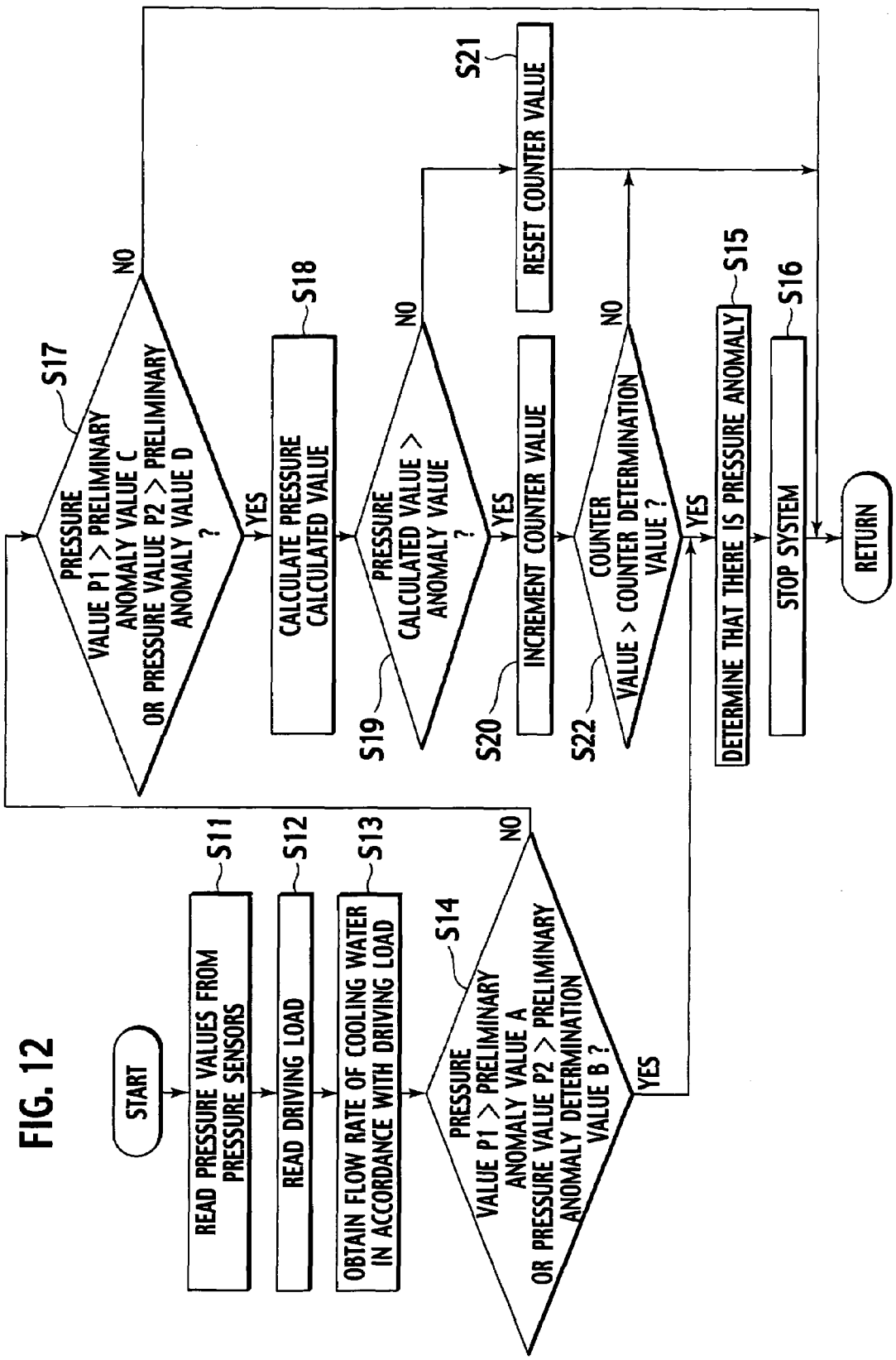

FUEL CELL SYSTEM

BACKGROUND OF THE INVENTION

1. Field of the Invention

The present invention relates to a fuel cell system for generating electricity by hydrogen gas and oxidant gas supplied thereto, and more specifically to a fuel cell system which can be mounted on a fuel cell vehicle or the like.

2. Description of the Related Art

A fuel cell system mountable on a vehicle or the like generates electricity by supplying hydrogen, serving as fuel gas, to a hydrogen electrode of the fuel cell and air, serving oxidant gas, to an air electrode of same and then by allowing them to react to each other. In a fuel cell system of this kind, pressure of cooling water and humidifying water, both supplied to a fuel cell stack, is detected by pressure sensors, respectively. When a pressure value detected by the pressure sensor is above an allowable value, the system determines that there is a pressure anomaly and stops supply of gas and water in order to prevent damage to the fuel cell stack.

A conventional technology which relates to pressure variation within piping as stated above is described in Japanese Patent Laid-Open Publication No. 2002-183113.

SUMMARY OF THE INVENTION

Sudden turning or braking or rough road driving of a vehicle induces vibration, lateral acceleration, longitudinal acceleration, or vertical acceleration of the vehicle, causing pressure variation of water flowing through piping. In particular, a fuel cell stack, which is operated at low pressure close to the ambient pressure, is designed to have low pressure resistance and thus has narrow pressure control range. At the same time, water-base liquid such as cooling water and humidifying water is high in density. Therefore, when a vehicle receives vibration or various types of acceleration, pressure varies at a position of a pressure sensor due to inertial force of water and a value detected by the pressure sensor may readily exceed an allowable value. With a conventional control, this kind of pressure variation owing to a driving condition of a vehicle is erroneously determined as excessive pressure and supply of gas and water to a fuel cell stack is thus stopped. This means that when a vehicle turns suddenly at high speed or runs a rough road, a fuel cell stack thereof could stop even though there is no substantial pressure anomaly.

The present invention has been accomplished in the light of the aforementioned problem and an object of the present invention is to provide a fuel cell system which accurately measures pressure within piping for supplying water to a fuel cell stack, and which thus does not erroneously determine that pressure variation due to vibration or various kinds of acceleration applied to a vehicle is excessive pressure.

The first aspect of the present invention provides a fuel cell system comprising: a water supply cycle which supplies water to a fuel cell stack through a piping; n numbers of pressure detectors provided on the piping and detecting pressure of the water, the n being an even number of two or greater, wherein if a center point of the piping is divided into n numbers of equal parts by axis lines and one of the axis lines is set as an axis line of a reference pressure detector, the other pressure detector is provided within an angle range of ±360/2n degrees about the other axis line; and a controller which determines a pressure anomaly of the water within the piping by comparing a predetermined anomaly value to a pressure calculated value obtained by calculation of pressure values detected by the n numbers of pressure detectors, the calculation including at least addition.

The second aspect of the present invention provides a fuel cell system comprising: a water supply cycle which supplies water to a fuel cell stack through a piping; n numbers of pressure detectors provided on the piping and detecting pressure of the water, the n being an odd number of three or greater, wherein if a center point of the piping is divided into n numbers of equal parts by axis lines and one of the axis lines is set as an axis line of a reference pressure detector, the other pressure detectors are provided within angle ranges of ±360/2n degrees about the other axis lines, respectively; and a controller which determines a pressure anomaly of the water within the piping by comparing a predetermined anomaly value to a pressure calculated value obtained by calculation of pressure values detected by at least two of the pressure detectors, the calculation including at least addition.

The third aspect of the present invention provides a fuel cell system comprising: a water supply cycle which supplies water to a fuel cell stack through a piping route; two pressure detectors provided on the piping route and detecting pressure of the water, wherein if a point reflecting on a horizontal plane a position of center of gravity of a total amount of water flowing through the piping route is set as a center point, and a line passing from one of the pressure detectors, which serves as a reference pressure detector, through the center point is set as an axis line, the other pressure detector is provided within an angle range of ±90 degrees about the axis line; and a controller which determines a pressure anomaly of the water within a piping by comparing a predetermined anomaly value to a pressure calculated value obtained by calculation of pressure values detected by the two pressure detectors, the calculation including at least addition.

The fourth aspect of the present invention provides a fuel cell system comprising: a water supply cycle which supplies water to a fuel cell stack through a piping route; n numbers of pressure detectors provided on the piping route and detecting pressure of the water, the n being an odd number of three or greater, wherein if a point reflecting on a horizontal plane a position of center of gravity of a total amount of water flowing through the piping route is set as a center point, and the center point is divided into n numbers of equal parts by axis lines, one of which is set as an axis line of a reference pressure detector, the other pressure detectors are provided within angle ranges of ±360/2n degrees about the other axis lines, respectively; and a controller which determines a pressure anomaly of the water within a piping by comparing a predetermined anomaly value to a pressure calculated value obtained by calculation of pressure values detected by at least two pressure detectors, the calculation including at least addition.

The fifth aspect of the present invention provides a fuel cell system comprising: a water supply cycle which supplies water to a fuel cell stack through a piping route; two pressure detectors provided on the piping route and detecting pressure of the water, wherein if a point reflecting on a vertical plane a position of center of gravity of a total amount of water flowing through the piping route is set as a center point, and a line passing from one of the pressure detectors, which serves as a reference pressure detector, through the center point is set as an axis line, the other pressure detector is provided within an angle range of ±90 degrees about the axis line; and a controller which determines a pressure anomaly of the water within a piping by comparing a predetermined anomaly value to a pressure calculated value obtained by calculation of pressure values detected by the two pressure detectors, the calculation including at least addition.

The sixth aspect of the present invention provides a fuel cell system comprising: a water supply cycle which supplies water to a fuel cell stack through a piping route; n numbers of pressure detectors provided on the piping route and detecting pressure of the water, the n being an odd number of three or greater, wherein if a point reflecting on a vertical plane a position of center of gravity of a total amount of water flowing through the piping route is set as a center point, and the center point is divided into n numbers of equal parts by axis lines, one of which is set as an axis line of a reference pressure detector, the other pressure detectors are provided within angle ranges of ±360/2n degrees about the other axis lines, respectively; and a controller which determines a pressure anomaly of the water within a piping by comparing a predetermined anomaly value to a pressure calculated value obtained by calculation of pressure values detected by at least two pressure detectors, the calculation including at least addition.

The seventh aspect of the present invention provides a fuel cell system comprising: a water supply cycle which supplies water to a fuel cell stack through a piping; n numbers of pressure detection means for detecting pressure of the water, which are provided on the piping, the n being an even number of two or greater, wherein if a center point of the piping is divided into n numbers of equal parts by axis lines and one of the axis lines is set as an axis line of reference pressure detection means, the other pressure detection means is provided within an angle range of ±360/2n degrees about the other axis line; and control means for determining a pressure anomaly of the water within the piping by comparing a predetermined anomaly value to a pressure calculated value obtained by calculation of pressure values detected by the n numbers of pressure detection means, the calculation including at least addition.

The eighth aspect of the present invention provides a fuel cell system comprising: a water supply cycle which supplies water to a fuel cell stack through a piping route; two pressure detection means provided on the piping route and detecting pressure of the water, wherein if a point reflecting on a horizontal plane a position of center of gravity of a total amount of water flowing through the piping route is set as a center point, and a line passing from one of the pressure detection means, which serves as reference pressure detection means, through the center point is set as an axis line, the other pressure detection means is provided within an angle range of ±90 degrees about the axis line; and control means for determining a pressure anomaly of the water within a piping by comparing a predetermined anomaly value to a pressure calculated value obtained by calculation of pressure values detected by the two pressure detection means, the calculation including at least addition.

The ninth aspect of the present invention provides a fuel cell system comprising: a water supply cycle which supplies water to a fuel cell stack through a piping route; two pressure detection means provided on the piping route and detecting pressure of the water, wherein if a point reflecting on a vertical plane a position of center of gravity of a total amount of water flowing through the piping route is set as a center point, and a line passing from one of the pressure detection means, which serves as reference pressure detection means, through the center point is set as an axis line, the other pressure detection means is provided within an angle range of ±90 degrees about the axis line; and control means for determining a pressure anomaly of the water within a piping by comparing a predetermined anomaly value to a pressure calculated value obtained by calculation of pressure values detected by the two pressure detection means, the calculation including at least addition.

BRIEF DESCRIPTION OF THE DRAWINGS

The invention will now be described with reference to the accompanying drawings wherein;

FIG. 1 is a schematic view of a cooling water supply cycle of a fuel cell system according to a first embodiment;

FIG. 12 is a flowchart showing a process for a controller to determine a pressure anomaly of cooling water according to the fifth embodiment;

DETAILED DESCRIPTION OF THE INVENTION

Figure 2A:
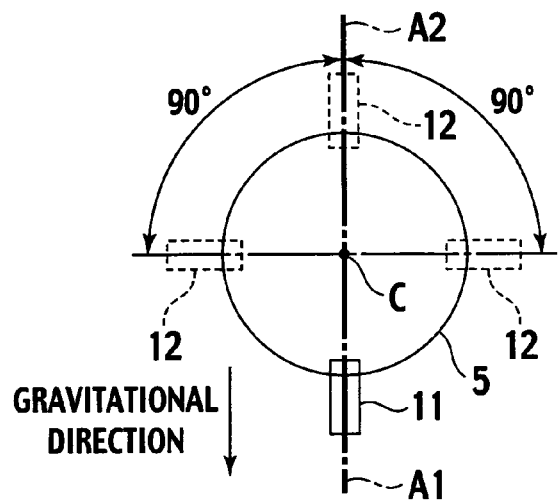
FIGS. 2A, 2B, 2C and 2D are schematic cross sectional views showing attachment positions of two pressure sensors in the first embodiment.

Embodiments that are the best modes for carrying out the present invention are described below. These embodiments show only parts related to the fuel cell system of the present invention, and descriptions and illustrations of the remaining parts, such as supply systems for gas and purified water, are omitted.

FIRST EMBODIMENT

FIG. 1 shows a cooling water supply cycle and attachment positions of pressure sensors in the fuel cell system according to the first embodiment. This cooling water supply cycle is provided with a reservoir tank 2 for storing cooling water, a radiator 3 for performing heat exchange between cooling water and cooling air, and a cooling water pump 4 for supplying cooling water to a fuel cell stack 1. The reservoir tank 2, the radiator 3 and the cooling water pump 4 are connected to each other by cooling water piping 5. In addition, pressure sensors 11 and 12 are attached to the cooling water piping 5. The pressure sensors 11 and 12 serve as pressure detecting devices for detecting pressures within the piping.

A controller 6 controls driving of the cooling water pump 4 and an air flow volume towards the radiator 3, in other words, revolution of a non-illustrated fan to obtain appropriate flow rate and temperature of cooling water. Moreover, the controller 6 reads external inputs of control information, that is, accelerator depression regarded as a driving load, and also reads pressure values detected by the pressure sensors 11 and 12, thus determining a pressure anomaly of cooling water in accordance with a flowchart of a process described later.

With the cooling water supply cycle having the above construction, during a normal operation of the stack 1, cooling water stored in the reservoir tank 2 is supplied to the stack 1 by the cooling water pump 4, and cooling water which has cooled the stack 1 and thus has increased temperature is heat-exchanged with cooling air in the radiator 3 and then returns to the reservoir tank 2. During these operations, driving of the cooling water pump 4, an air flow volume towards the radiator 3 and the like are adjusted by control signals from the controller 6 so that temperature of cooling water supplied to the stack 1 is adjusted to an appropriate level.

Figure 2B:
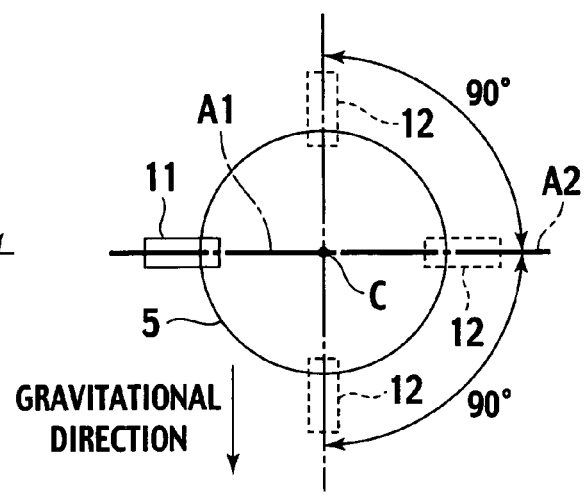
Figure 2C:
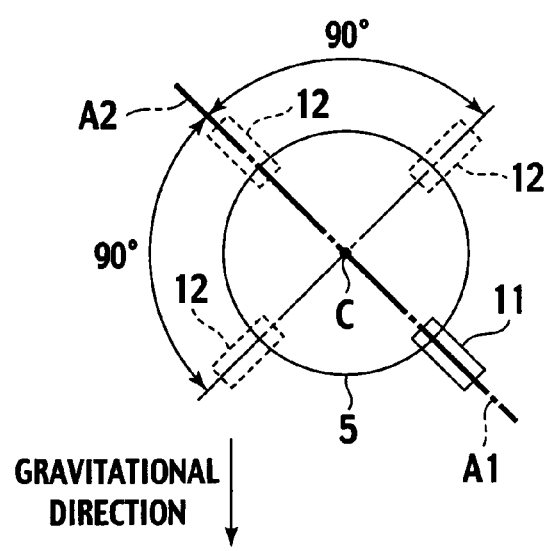
Figure 2D:
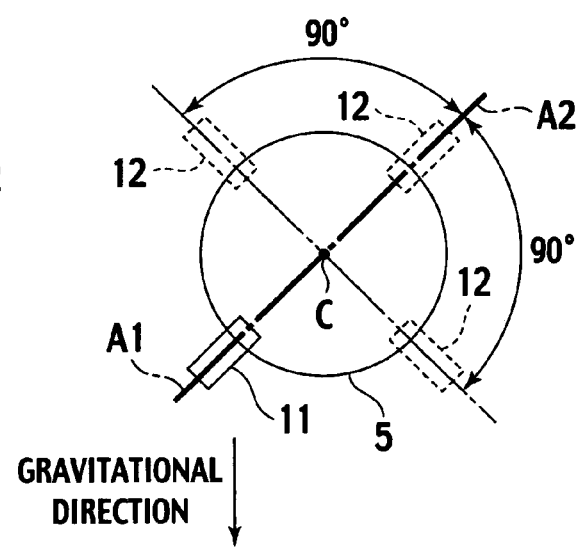
Figure 3:
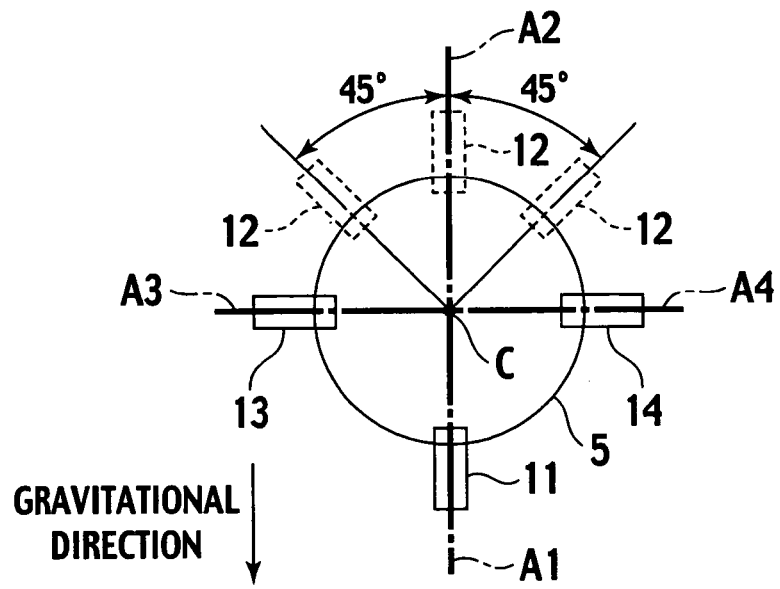
FIG. 3 is a schematic cross sectional view showing attachment positions of four pressure sensors in the first embodiment.

Next, attachment positions of pressure sensors on the cooling water piping 5 are described. FIGS. 2A to 2D and FIG. 3 show attachment positions of pressure sensors. FIGS. 2A to 2D show examples where the number n of pressure sensors is two (n=2), and FIG. 3 shows an example where the number n of pressure sensors is four (n=4).

In this embodiment, where the center point C of the cooling water piping 5 is divided into n equal parts by axis lines, one of the axis lines is set as the axis line of a reference pressure sensor, and the other sensor(s) is positioned within an angle range of ±360/2n degrees about the other axis line(s). The reference pressure sensor is a reference used in deciding positions of pressure sensors and can be set arbitrarily. In this embodiment, the number n of pressure sensors is an even number equal to or more than two.

Positions of two pressure sensors (n=2) are described with reference to FIG. 2A. Where the center point C of the cooling water piping 5 is divided into 2 equal parts by axis lines A1 and A2, the axis line A1 is set as the axis line of a reference pressure sensor 11. In this case, the other pressure sensor 12 is positioned within an angle range of ±90 degrees about the other axis line A2. In FIG. 2A, the axis lines A1 and A2 are on the same line. FIG. 2A also shows an example where the reference pressure sensor 11 is positioned at the lowermost part of the cooling water piping 5 in the gravitational direction. Further, FIG. 2A shows the pressure sensors 12 depicted by a broken line indicating that the pressure sensor 12 can be positioned within the angle range of ±90 degrees. Incidentally, FIG. 2B shows an example where the reference pressure sensor 11 is positioned on the left side of the cooling water piping 5 in the horizontal direction. FIG. 2C shows an example where the reference pressure sensor 11 is positioned at 45 degrees to the right from the lowermost part of the cooling water piping 5 in the gravitational direction. FIG. 2D shows an example where the reference pressure sensor 11 is positioned at 45 degrees to the left from the lowermost part of the cooling water piping 5 in the gravitational direction. In FIGS. 2B to 2D, the pressure sensor 12 is also positioned within an angle range of ±90 degrees about the other axis line A2 relative to the axis line A1 of the reference pressure sensor 11. However, the position of the reference pressure sensor 11 is not limited to those in the examples shown in FIGS. 2A to 2D and it may be positioned at any different angle.

Where the reference pressure sensor 11 is positioned at the lowermost part of the cooling water piping 5 in the gravitational direction as shown in FIG. 2A, pressure can be measured accurately for vertical acceleration of a vehicle. Where the reference pressure sensor 11 is positioned as shown in FIG. 2B, pressure can be measured accurately for lateral acceleration of a vehicle.

Next, positions of four pressure sensors (n=4) are described with reference to FIG. 3. In this example, four pressure sensors including pressure sensors 13 and 14, which are not illustrated in FIG. 1, are attached. As shown in FIG. 3, where the center point C of the cooling water piping 5 is divided into four equal parts by axis lines A1 to A4, and the axis line A1 is set as the axis line of the reference pressure sensor 11, the pressure sensors 12, 13 and 14 are positioned within angle ranges of ±45 degrees about the axis lines A2, A3 and A4, respectively. Note that FIG. 3 shows an example where only the pressure sensor 12, depicted by a broken line, can be positioned within the angle range of ±45 degrees and the pressure sensors 13 and 14 are positioned at the axis lines A3 and A4, respectively. Similarly to the pressure sensor 12, the pressure sensors 13 and 14 may be positioned within the angle ranges of ±45 degrees about the corresponding axis lines, respectively.

Figure 5:
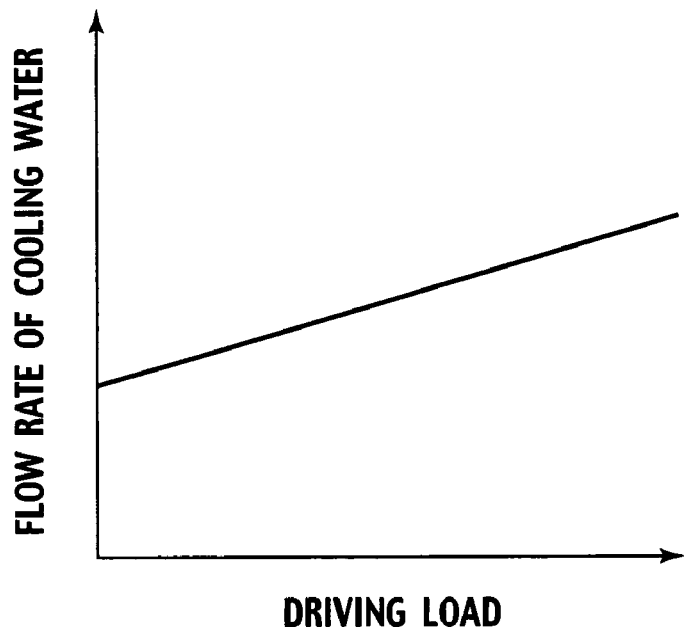
FIG. 5 is a view showing an appropriate flow rate of cooling water for each driving load.
Figure 6:
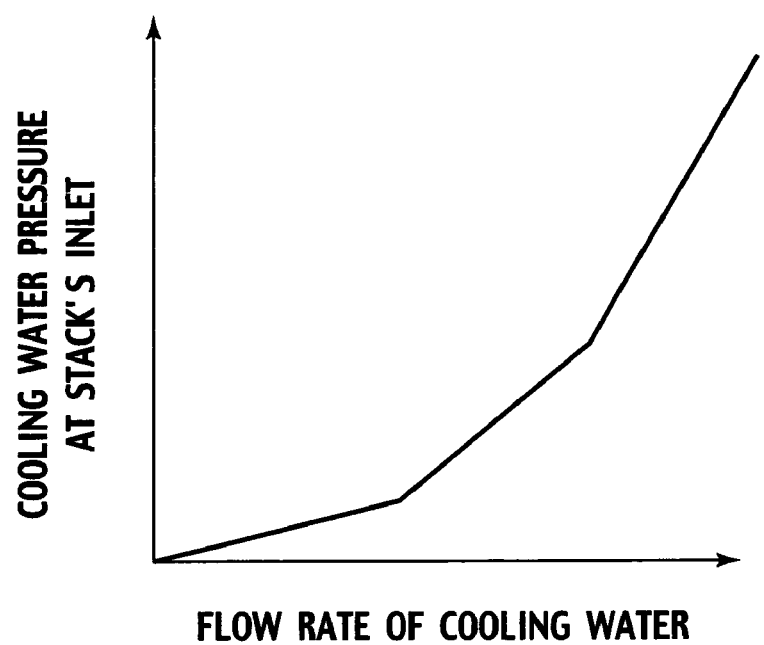
FIG. 6 is a view showing a relationship between a flow rate of cooling water and pressure of cooling water at a stack inlet.

Next, a process for the controller 6 to determine a pressure anomaly of cooling water using pressure values detected by the pressure sensors 11 and 12 are described with reference to the flowchart of FIG. 4. The process shown in this flowchart begins with activation of the stack 1 and is repeated every predetermined time. FIG. 5 shows an appropriate flow rate of cooling water for each driving load, and FIG. 6 shows a relationship between a flow rate of cooling water and a cooling water pressure at the stack's intake.

First of all, in step S1, the controller 6 reads pressure values detected by the pressure sensors 11 and 12. The controller 6 then reads accelerator depression as a driving load in step S2, and obtains an appropriate flow rate of cooling water for the driving load according to the view of FIG. 5 in step S3. Thereafter, the controller 6 controls driving of the cooling water pump 4 to realize the abovementioned flow rate of cooling water, obtaining a cooling water pressure at the stack's inlet as shown in FIG. 6.

Next, in step S4, the controller 6 calculates a pressure calculated value using the pressure values from the pressure sensors 11 and 12 that the controller read in step S1. In this step, obtained is either an added value (summation) or an average value of two pressure values read by the controller 6. For example, where pressure values detected by the pressure sensors 11 to 14 are represented by P1 to P4, respectively, an added value in a case of a pair of pressure sensors is obtained by P1+P2, whereas same in a case of two pairs of pressure sensors is obtained by P1+P2+P3+P4. Meanwhile, an average value in the case of a pair of pressure sensors is obtained by (P1+P2)/2, whereas same in the case of two pairs of pressure sensors is obtained by (P1+P2+P3+P4)/4.

In the next step S5, the controller 6 determines whether the pressure calculated value obtained in step S4 is a predetermined anomaly value or greater. Where the pressure calculated value is the anomaly value or greater, the process proceeds to step S6 in order to integrate time durations during which the pressure calculated value has been the anomaly value or greater, and a counter value is incremented. Where the pressure calculated value is smaller than the anomaly value in step S5, the controller 6 resets the counter value.

Next, in step S8, the controller 6 determines whether the integrated counter value is a counter determination value or greater. The counter determination value is a value used for determining whether time periods, during which a pressure calculated value is the anomaly value or greater, has continued for a predetermined period or longer. Where the counter value is the counter determination value or longer in this step, the controller 6 determines that there is a pressure anomaly of cooling water in step S9 and then execute a process to stop the fuel cell system in step S10. Where the counter value is smaller than the counter determination value in step S8, the process proceeds to "Return" and waits until the next process begins.

As described so far, in this embodiment, n numbers of pressure sensors are positioned at substantially opposite sides to each other within predetermined angle ranges, respectively, and presence of a pressure anomaly is determined by comparing the anomaly value to an added value or an average value of pressure values detected by the respective pressure sensors. This makes it possible to measure pressure more accurately irrespective of driving conditions of a vehicle, in comparison with a case where a pressure value is detected by a single pressure sensor. In other words, in this embodiment, even if a pressure value from one of the pressure sensors is large due to acceleration G in one direction, the controller 6 does not determine the value as a pressure anomaly as long as an added value or an average value of the pressure values from both pressure sensors is smaller than the anomaly value. Hence, pressure variation, caused by vibration or various kinds of acceleration of a vehicle, is not erroneously determined as excessive pressure. This prevents a problem that the controller 6 stops the stack when a vehicle turns suddenly at high speed or runs a rough road, even though there is no substantial pressure anomaly.

Further, in the present invention, the controller 6 determines that there is a pressure anomaly when a pressure calculated value, obtained based upon pressure values from the respective pressure sensors, exceeds the anomaly value for a predetermined period of time or longer. Therefore, pressure variation for a short period of time due to vehicle acceleration G in a single direction is not determined as excessive pressure erroneously, and only pressure variation due to some abnormality is determined as a pressure anomaly. Accordingly, the stack can be driven at the highest possible allowable pressure without causing any damage to the stack.

SECOND EMBODIMENT

Next, as the second embodiment, an example is described where the ranges for attachment positions of pressure sensors described in the first embodiment are further limited. The construction of a cooling water supply cycle and a process for the controller 6 to determine a pressure anomaly in the second embodiment are the same as those of the first embodiment, and the description thereof is thus omitted. Further, parts equivalent to those in the first embodiment are designated by the same reference numerals in the following description.

Figure 8:
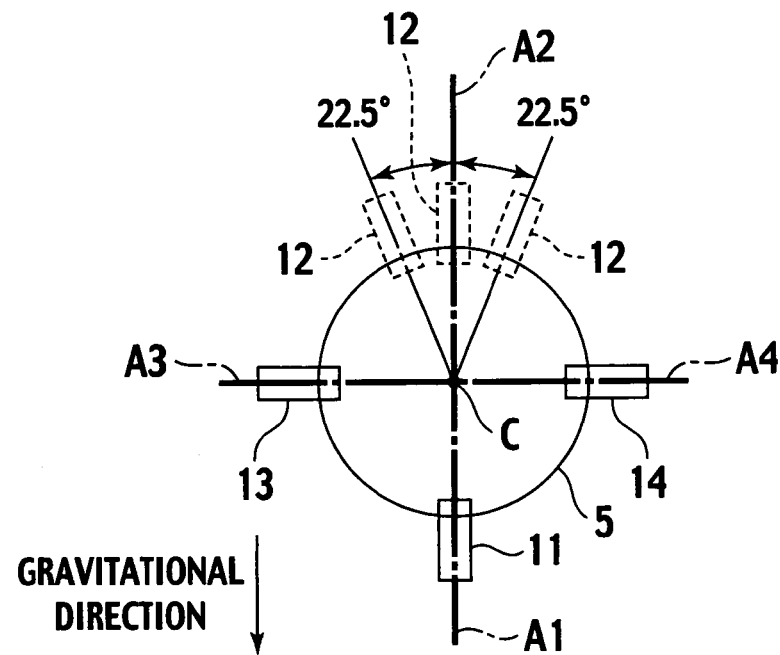
FIG. 8 is a schematic cross sectional view showing attachment positions of four pressure sensors according to the second embodiment.

FIGS. 7A to 7D and FIG. 8 show attachment positions of the pressure sensors in the second embodiment. FIGS. 7A to 7D show examples where the number n of the pressure sensors is two (n=2), and FIG. 8 shows an example where the number n of the pressure sensors is four (n=4).

In this embodiment, where the center point C of the cooling water piping 5 is divided into n equal parts by axis lines, and one of the axis lines is set as the axis line of a reference pressure sensor, the other 1 or 3 sensor(s) is positioned within an angle range(s) of ±360/4n degrees about the other axis line(s). The reference pressure sensor is a reference used in deciding positions of pressure sensors and can be set arbitrarily. In this embodiment, the number of pressure sensors is an even number equal to or more than two.

Figure 7A:
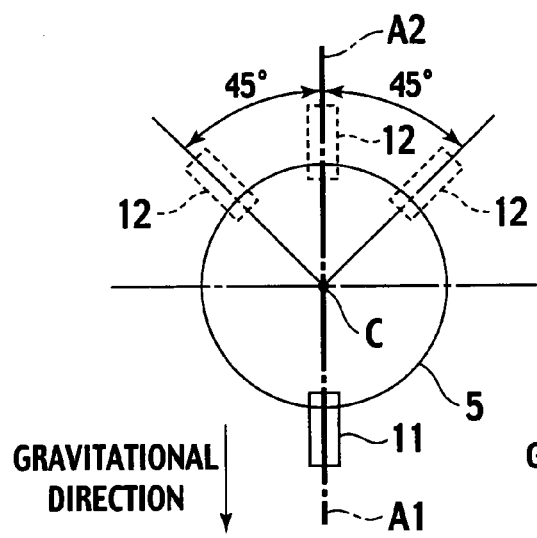
FIGS. 7A, 7B, 7C and 7D are schematic cross sectional views showing attachment positions of two pressure sensors according to a second embodiment.
Figure 7B:
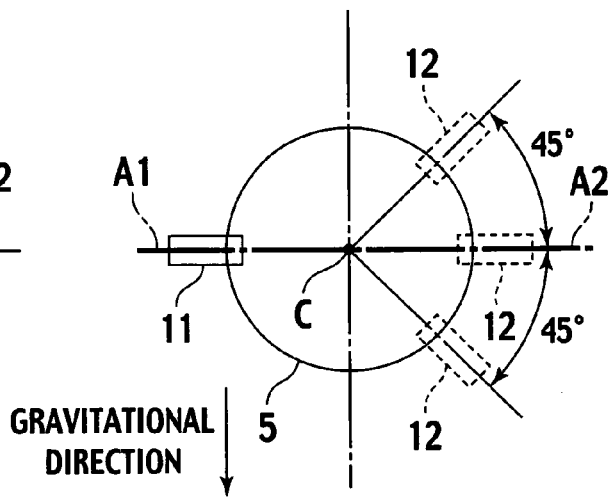
Figure 7C:
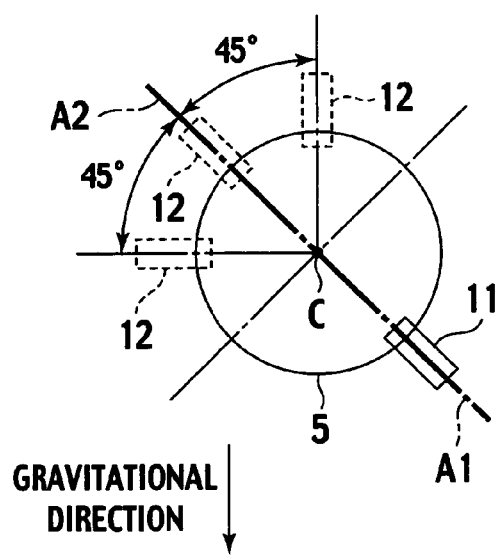
Figure 7D:
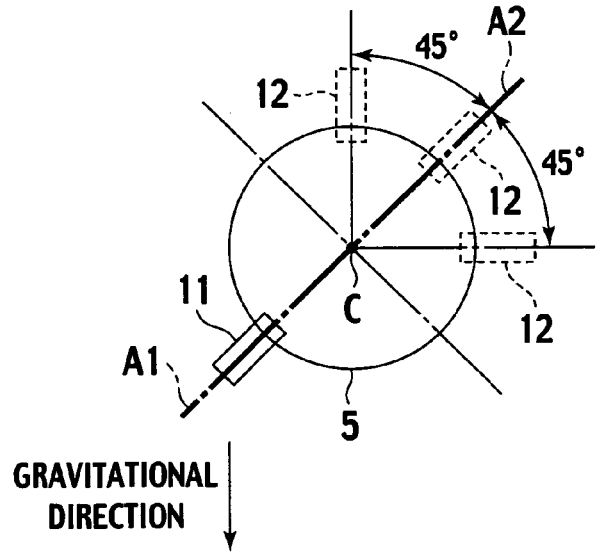

Positions of two pressure sensors (n=2) are described with reference to FIG. 7A. Where the center point C of the cooling water piping 5 is divided into two equal parts by axis lines A1 and A2, the axis line A1 is set as the axis line of a reference pressure sensor 11. In this case, the other pressure sensor 12 is positioned within an angle range of ±45 degrees about the other axis line A2. In FIG. 7A, the axis lines A1 and A2 are on the same line. FIG. 7A also shows an example where the reference pressure sensor 11 is positioned at the lowermost part of the cooling water piping 5 in the gravitational direction. Further, FIG. 7A shows the pressure sensors 12 depicted by a broken line indicating that the pressure sensor 12 can be positioned within the angle range of ±45 degrees. Incidentally, FIG. 7B shows an example where the reference pressure sensor 11 is positioned on the left side of the cooling water piping 5 in the horizontal direction. FIG. 7C shows an example where the reference pressure sensor 11 is positioned at 45 degrees to the right from the lowermost part of the cooling water piping 5 in the gravitational direction. FIG. 7D shows an example where the reference pressure sensor 11 is positioned at 45 degrees to the left from the lowermost part of the cooling water piping 5 in the gravitational direction. In FIGS. 7B to 7D, the pressure sensor 12 is also positioned within an angle range of ±45 degrees about the other axis line A2 relative to the axis line A1 of the reference pressure sensor 11. The position of the reference pressure sensor 11 is not limited to those in the examples shown in FIGS. 7A to 7D.

In this embodiment, where the reference pressure sensor 11 is positioned at the lowermost part of the cooling water piping 5 in the gravitational direction as shown in FIG. 7A, pressures can be measured accurately for vertical acceleration of a vehicle. Where the reference pressure sensor 11 is positioned as shown in FIG. 7B, pressures can be measured accurately for lateral acceleration of a vehicle.

Next, positions of four pressure sensors (n=4) are described with reference to FIG. 8. As shown in FIG. 8, where the center point C of the cooling water piping 5 is divided into four equal parts by axis lines A1 to A4, and the axis line A1 is set as the axis line of the reference pressure sensor 11, the pressure sensors 12, 13 and 14 are positioned within angle ranges of ±22.5 degrees about the rest of the axis lines A2, A3 and A4, respectively. FIG. 8 also shows an example where only the pressure sensor 12, depicted by a broken line, can be positioned within the angle range of ±22.5 degrees and the pressure sensors 13 and 14 are positioned at the axis lines A3 and A4, respectively. Similarly to the pressure sensor 12, the pressure sensors 13 and 14 may be positioned within the angle ranges of ±22.5 degrees about the corresponding axis lines, respectively.

According to the configuration of this embodiment, the remaining pressure sensors are positioned more appropriately relative to the reference pressure sensor. Therefore, pressure can be measured even more accurately than the first embodiment.

In FIGS. 2A to 8, it is preferred that the reference pressure sensor and the other pressure sensors be positioned on the same circumference of the cooling water piping 5. However, the pressure sensors may be interspaced lengthwise from the piping unless there is a constituent, such as a radiator, which may cause a pressure loss between the piping and sensors.

THIRD EMBODIMENT

Next, as the third embodiment, an example is described where the number n of pressure sensors in the first embodiment is now three (n=3). The construction of a cooling water supply cycle in the third embodiment is the same as that of the first embodiment, and the description thereof is thus omitted. Further, parts equivalent to those in the first embodiment are designated by the same reference numerals in the following description.

Figure 9:
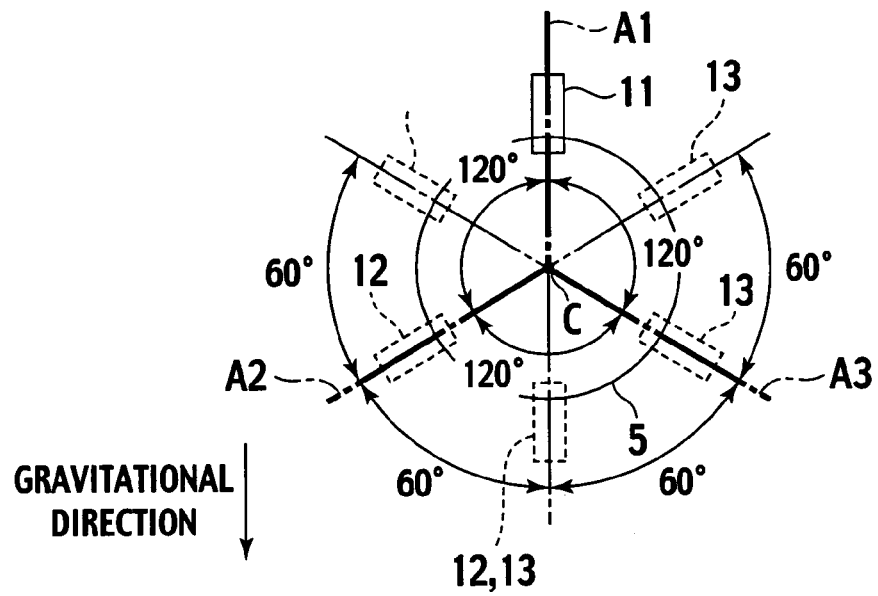
FIG. 9 is a schematic cross sectional view showing attachment positions of three pressure sensors according to a third embodiment.

FIG. 9 shows attachment positions of pressure sensors in the third embodiment and an example where the number n of the pressure sensors is three (n=3).

In this embodiment, where the center point C of the cooling water piping 5 is divided into three equal parts by axis lines, and one of the axis lines is set as the axis line of a reference pressure sensor, the other two sensors are positioned within angle ranges of ±360/2n degrees about the other axis lines, respectively. The reference pressure sensor is a reference used in deciding positions of pressure sensors and can be set arbitrarily.

Positions of three pressure sensors (n=3) are described with reference to FIG. 9. As shown in FIG. 9, where the center point C of the cooling water piping 5 is divided into three equal parts by axis lines A1 to A3, the axis line A1 is set as the axis line of a reference pressure sensor 11. In this case, the pressure sensor 12 is positioned within an angle range of ±60 degrees about the axis line A2, and the pressure sensor 13 is positioned within and angle range of ±60 degrees about the axis line A3. FIG. 9 shows an example where the reference pressure sensor 11 is positioned at the uppermost part of the cooling water piping 5 in the gravitational direction, and the pressure sensors 12 and 13 depicted by a broken line indicate that the pressure sensors 12 and 13 may be positioned within angle ranges of ±60 degrees, respectively.

Figure 4:
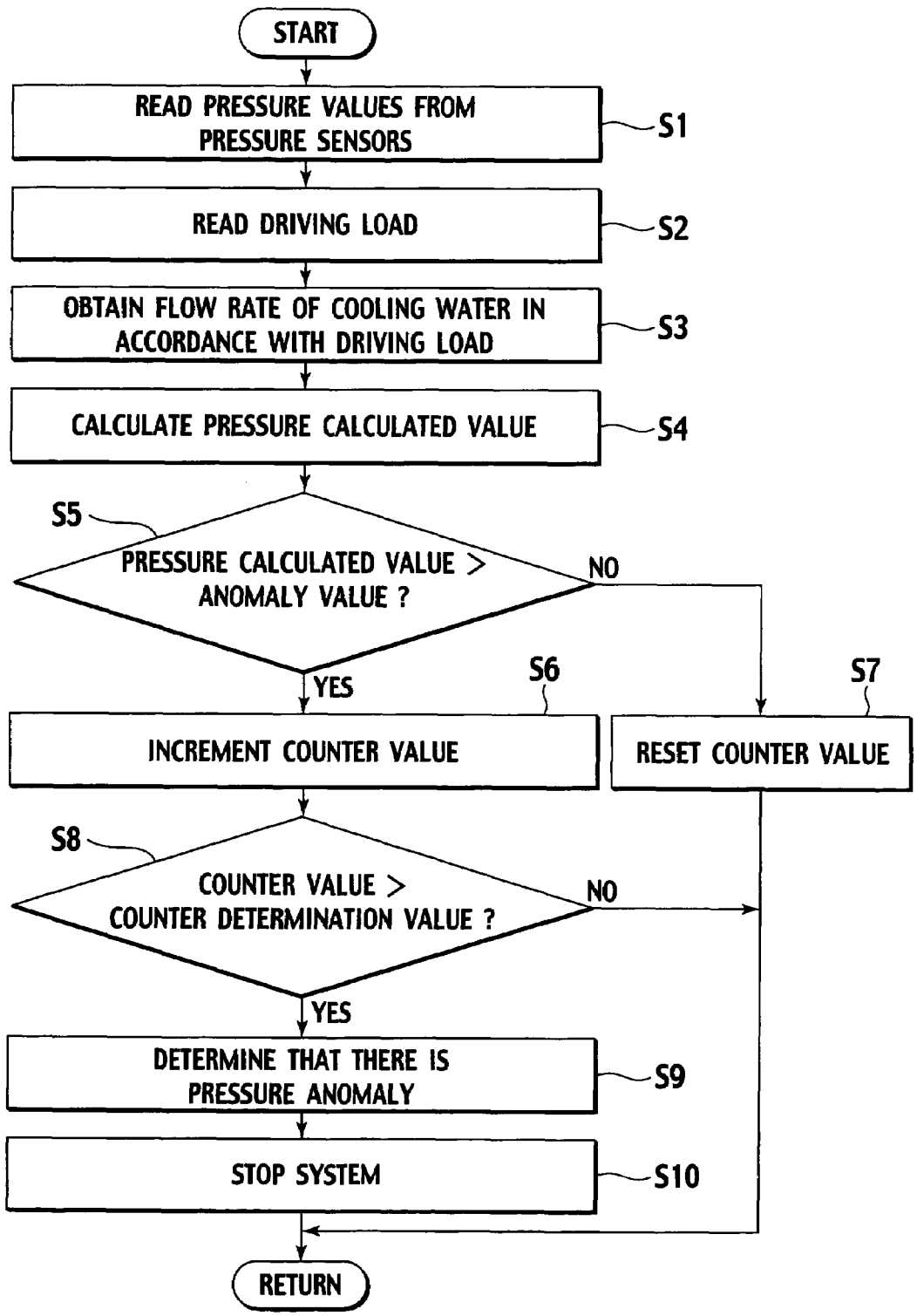
FIG. 4 is a flowchart showing a process for a controller to determine a pressure anomaly of cooling water according to the first embodiment.

A process for reading pressure values from the pressure sensors 11, 12 and 13 positioned as above and determination of a pressure anomaly of cooling water by the controller 6 are the same as those in the flowchart of FIG. 4 described earlier. Since three pressure sensors are provided in this embodiment, pressure values detected by at least two pressure sensors are used for calculation of an added value or an average value in step S4 of FIG. 4.

As described so far, in this embodiment, three pressure sensors are positioned at substantially opposite sides to each other within predetermined angle ranges. In addition, a pressure anomaly is determined by comparing an anomaly value to an added value or an average value of pressure values detected by at least two pressure sensors out of the aforementioned three sensors. This makes it possible to measure pressure more accurately irrespective of driving conditions of a vehicle, in comparison with a case where a pressure value is detected by a single pressure sensor. In other words, where an anomaly value is compared to an added value or an average value of pressure values detected by two pressure sensors, even if a pressure value from one of the pressure sensors is large due to acceleration G in one direction, the controller 6 does not determine the value as a pressure anomaly as long as the added value or the average value of the pressure values from both pressure sensors is smaller than the anomaly value. Hence, pressure variation, caused by vibration or various kinds of acceleration of a vehicle, is not erroneously determined as excessive pressure.

Further, where the anomaly value is compared to an added value or an average value of pressure values detected by all three pressure sensors, even if pressure values from two of the pressure sensors are large due to acceleration G in two directions, the controller 6 does not determine the values as pressure anomalies as long as the added value or the average value of the pressure values from all the pressure sensors is smaller than the anomaly value. Hence, pressure variation, caused by vibration or various kinds of acceleration of a vehicle, is not erroneously determined as excessive pressure. This prevents a problem that the controller 6 stops a stack when a vehicle turns suddenly at high speed or runs a rough road, even though there is no substantial pressure anomaly.

Moreover, in step S4 of the flowchart in FIG. 4, an added value or an average value is calculated using pressure values detected by at least two pressure sensors. Further, where a pressure calculated value obtained based upon pressure values from the respective pressure sensors is above an anomaly value for a predetermined period of time or longer, the controller 6 determines that there is a pressure anomaly. In this case, pressure variation caused by vehicle acceleration G in one direction or two is not determined as excessive pressure erroneously. Therefore, only pressure variation caused by some abnormality can be determined as a pressure anomaly. Accordingly, the stack can be driven at the highest possible allowable pressure without causing any damage to the stack.

FOURTH EMBODIMENT

Next, as the fourth embodiment, an example is described where the ranges for attachment positions of pressure sensors shown in the third embodiment are further limited.

Figure 10:
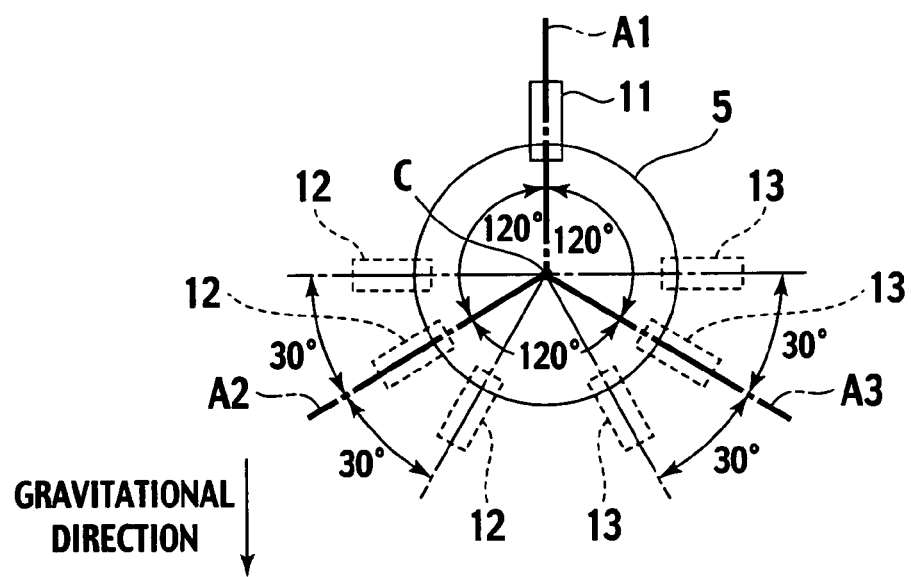
FIG. 10 is a schematic cross sectional view showing attachment positions of three pressure sensors according to a fourth embodiment.

FIG. 10 shows attachment positions of pressure sensors in the fourth embodiment and an example where the number n of the pressure sensors is three (n=3).

In this embodiment, where the center point C of the cooling water piping 5 is divided into three equal parts by axis lines, one of the axis lines is set as the axis line of a reference pressure sensor, and the other two sensors are positioned within angle ranges of ±360/4n degrees about the other axis lines, respectively. The reference pressure sensor is a reference used in deciding positions of pressure sensors and can be set arbitrarily.

In this embodiment, where the center point C of the cooling water piping 5 is divided into three equal parts by axis lines A1 to A3, the axis line A1 is set as the axis line of a reference pressure sensor 11. In this case, the other pressure sensors 12 and 13 are positioned within angle ranges of ±30 degrees about the other axis lines A2 and A3, respectively. FIG. 10 also shows an example where the reference pressure sensor 11 is positioned at the uppermost part of the cooling water piping 5 in the gravitational direction. Further, FIG. 10 shows the pressure sensors 12 and 13 depicted by a broken line, indicating that the pressure sensors 12 and 13 can be positioned within the angle ranges of ±30 degrees, respectively. The position of the reference pressure sensor 11 is not limited to that in the example shown in FIG. 10 and may be positioned at any different angle.

According to the configuration of this embodiment, the remaining two pressure sensors are positioned more appropriately relative to the reference pressure sensor. Therefore, pressure can be measured even more accurately than the third embodiment.

In FIGS. 9 and 10, it is preferred that the reference pressure sensor and the other two pressure sensors be positioned on the same circumference of the cooling water piping 5. However, the pressure sensors may be interspaced lengthwise from the piping unless there is a constituent which may cause a pressure loss between the piping and sensors.

FIFTH EMBODIMENT

Figure 11A:
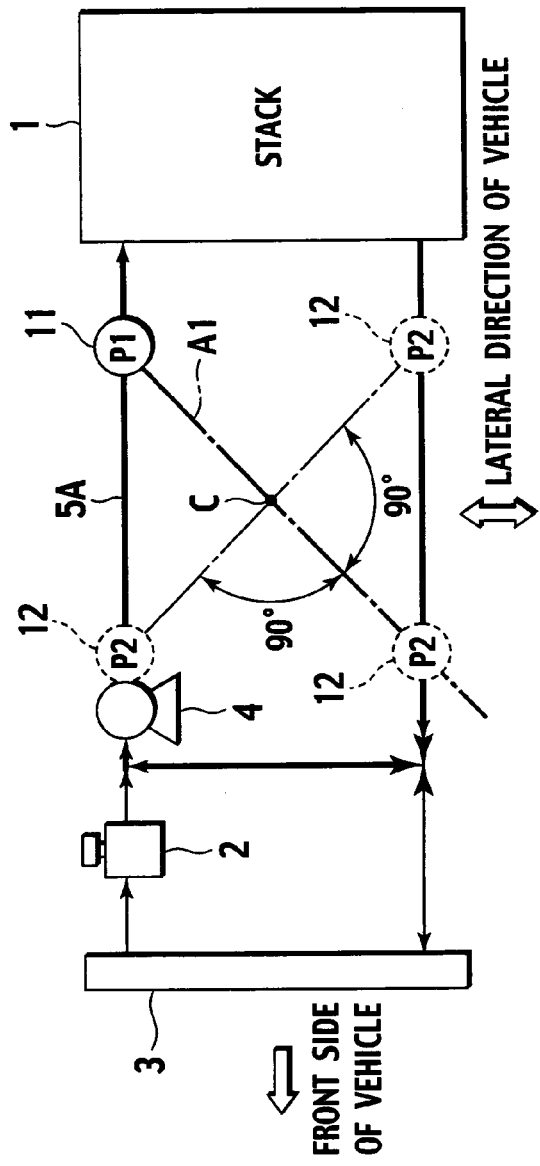
FIGS. 11A and 11B are schematic views showing a cooling water supply cycle and attachment positions of pressure sensors of in a fuel cell system according to a fifth embodiment.
Figure 11B:
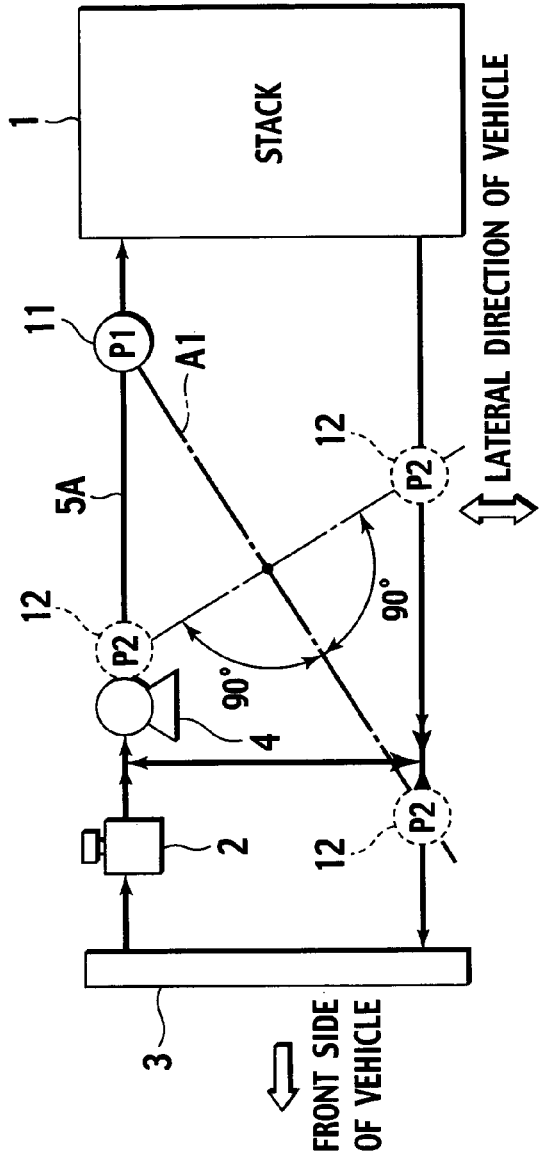

FIGS. 11A and 11B show a cooling water cycle and attachment positions of pressure sensors in the fuel cell system according to the fifth embodiment. These figures are top views of a cooling water supply route. In FIGS. 11A and 11B, parts equivalent to those of FIG. 1 are designated by the same reference numerals, and the controller 6 and other peripherals shown in FIG. 1 are not illustrated.

In this embodiment, a pair of pressure sensors 11 and 12 is provided, and a line passing from the reference pressure sensor 11 through the center point C is set as an axis line A1. The other pressure sensor 12 is positioned on the opposite side to the reference pressure sensor 11 about the center point C shown in the drawings and within an angle range of ±90 degrees about the axis line A1. Here, the center point C represents a point reflecting on a horizontal plane a position of the center of gravity of the total amount of cooling water which flows through a cooling water piping route 5A, and the pressure sensors 11 and 12 are provided at positions substantially opposite to each other about the center point C which serves as a base point. Further, the reference pressure sensor 11 acts as a reference in deciding positions of the respective pressure sensors and its position can be set arbitrarily. In FIGS. 11A and 11B, the pressure sensors 12 depicted by a broken line indicates that the pressure sensor 12 can be positioned within an angle range of ±90 degrees about the axis line A1.

FIG. 11A shows a positional relationship between the pressure sensors in a case where cooling water circulates without passing through the radiator 3. In this case, the center point C is located on the side of the stack 1. However, where cooling water circulates through the radiator 3 as shown in FIG. 11B, the center point C is to be located on the side of the radiator 3. Since the position of the center point C changes depending on a circulation route of cooling water as described above, a range of the position of the pressure sensor 12 relative to the reference pressure sensor 11 also changes. Therefore, a range where the pressure sensor 12 is positioned at the opposite side of the reference pressure sensor 11 is set in accordance with a main circulation route of cooling water.

Next, a process for the controller 6 to determine a pressure anomaly using pressure values detected by the pressure sensors 11 and 12 are described with reference to the flowchart shown in FIG. 12. The process shown in FIG. 12 begins with activation of the stack 1 and is repeated every predetermined time. Pressure values detected by the pressure sensors 11 and 12 are represented by P1 and P2, respectively.

First of all, in step S11, the controller 6 reads pressure values detected by the pressure sensors 11 and 12. The controller 6 then reads accelerator depression as a driving load in step S12, and obtains an appropriate flow rate of cooling water for the driving load according to the view of FIG. 5 in step S13. Thereafter, the controller 6 controls driving of the cooling water pump 4 to realize the abovementioned flow rate of cooling water, obtaining cooling water pressure at the stack's inlet as shown in FIG. 6.

Next, in step S14, the controller 6 determines whether the pressure value P1 read from the pressure sensor 11 in step S11 is a predetermined preliminary anomaly value A or greater, or whether the pressure value P2 from the pressure sensor 12 is a predetermined preliminary anomaly value B or greater. Where either of the pressure values is the corresponding anomaly value or above, the controller 6 determines that there is a pressure anomaly of cooling water in step S15 and then executes a process for stopping the fuel cell system in step S16. Where both pressure values are smaller than the anomaly values in step S14, the process proceeds to step S17.

In step S17, the controller 6 determines whether the pressure value P1 from the pressure sensor 11 is a predetermined preliminary anomaly value C or greater, or whether the pressure value P2 from the pressure sensor 12 is a predetermined preliminary anomaly value D or greater. Where either of the pressure values is the corresponding anomaly value or greater, the process proceeds to step S18, and an added value P1+P2 or an average value (P1+P2)/2 of the two pressure values read by the controller 6 is calculated as a pressure calculated value. The preliminary anomaly value C is smaller than the preliminary anomaly value A, and the preliminary anomaly value D is smaller than the preliminary anomaly value B.

Next, in step S19, the controller 6 determines whether the pressure calculated value obtained in step S18 is a predetermined anomaly value or greater. Where the pressure calculated value is the anomaly value or greater, the process proceeds to step S20 in order to integrate time duration during which the pressure calculated value has been the anomaly value or greater, and a counter value is incremented. In step S19, where the pressure calculated value is smaller than the anomaly value, the process proceeds to step S21, where the counter value is reset, and then to "Return" to wait until the next process begins.

Next, in step S22, the controller 6 determines whether the integrated counter value is a counter determination value or greater. Where the counter value is the counter determination value or greater in this step, in other words, where the pressure calculated value is above the anomaly value for a predetermined period of time or longer, the controller 6 determines that there is a pressure anomaly of cooling water in step s15, and then execute a process to stop the fuel cell system in step S16. Where the counter value is smaller than the counter determination value in step S22, the process proceeds to "Return" and waits until the next process begins.

As described so far, in the present invention, a pair of pressure sensors is positioned in substantially opposite sides to each other about the center point C, serving as a base point, set in a cooling water piping route. In addition, a pressure anomaly is determined by comparing an anomaly value to an added value or an average value of pressure values detected by the respective pressure sensors. This makes it possible to measure pressure more accurately for longitudinal and lateral acceleration of a vehicle in comparison with a case where a pressure value is detected by a single pressure sensor. In other words, in this embodiment, even if a pressure value from one of the pressure sensors is large due to acceleration G in one direction, the controller 6 does not determine the value as a pressure anomaly as long as an added value or an average value of the pressure values from both pressure sensors is smaller than the anomaly value. Hence, pressure variation, caused by longitudinal and lateral acceleration of a vehicle, is not erroneously determined as excessive pressure. This prevents a problem that the controller 6 stops the stack when a vehicle turns suddenly at high speed or runs a rough road, even though there is no substantial pressure anomaly.

Further, in the present invention, the controller 6 determines that there is a pressure anomaly when a pressure calculated value, obtained based upon pressure values from the respective pressure sensors, exceeds the anomaly value for a predetermined period of time or longer. Therefore, pressure variation for a short period of time due to longitudinal and lateral acceleration of a vehicle is not determined as excessive pressure erroneously, and only pressure variation caused by some abnormality is determined as a pressure anomaly. Accordingly, the stack can be driven at the highest possible allowable pressure without causing any damage to the stack.

Furthermore, in this embodiment, the controller 6 determines that there is a pressure anomaly when one of pressure values detected by two pressure sensors is above the preliminary anomaly value. Therefore, the controller 6 can determine swiftly that there is a pressure anomaly if a pressure level increases excessively in a short period of time.

SIXTH EMBODIMENT

Next, as the sixth embodiment, an example is described where the ranges of attachment positions of pressure sensors described in the fifth embodiment are further limited. The construction of a cooling water supply cycle and a process for the controller 6 to determine a pressure anomaly in the sixth embodiment are the same as those of the fifth embodiment and the descriptions thereof are thus omitted.

Figure 13A:
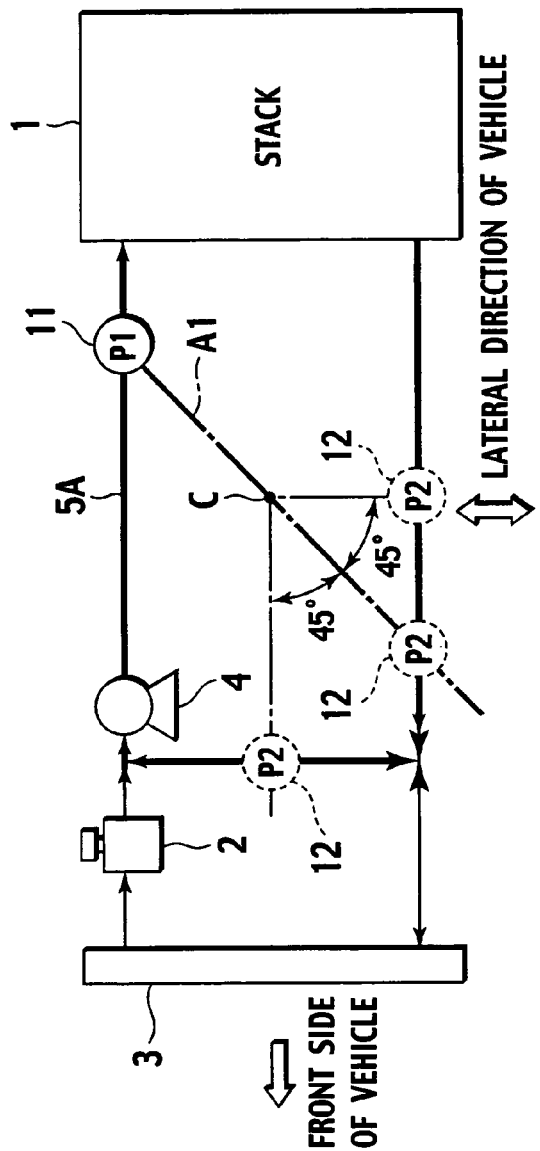
FIGS. 13A and 13B are schematic views showing attachment positions of two pressure sensors according to a sixth embodiment.
Figure 13B:
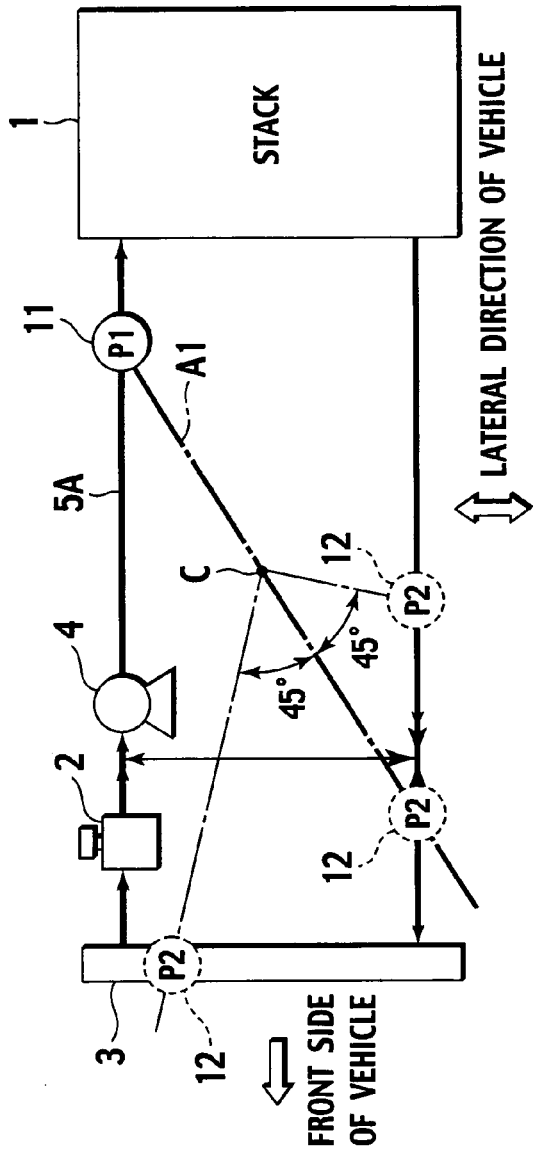

FIGS. 13A and 13B show attachment positions of pressure sensors in the sixth embodiment. In this embodiment, a pair of pressure sensors 11 and 12 is provided, and a line passing from the reference pressure sensor 11 through the center point C is set as an axis line A1. The other pressure sensor 12 is positioned on the opposite side to the reference pressure sensor 11 about the center point C shown in the drawings and within an angle range of ±45 degrees about the axis line A1. In FIGS. 13A and 13B, the pressure sensors 12 are depicted by a broken line indicating that the pressure sensor 12 may be positioned within an angle range of ±45 degrees about the axis line A1.

According to the construction of this embodiment, the other pressure sensor is positioned more appropriately relative to the reference pressure sensor. Therefore, pressure can be measured even more accurately than the fifth embodiment.

SEVENTH EMBODIMENT

Next, as the seventh embodiment, an example where the number n of pressure sensors described in the fifth embodiment is now three (n=3). The construction of a cooling water supply cycle in the seventh embodiment is the same as that of the fifth embodiment, and the description thereof is thus omitted.

Figure 14:
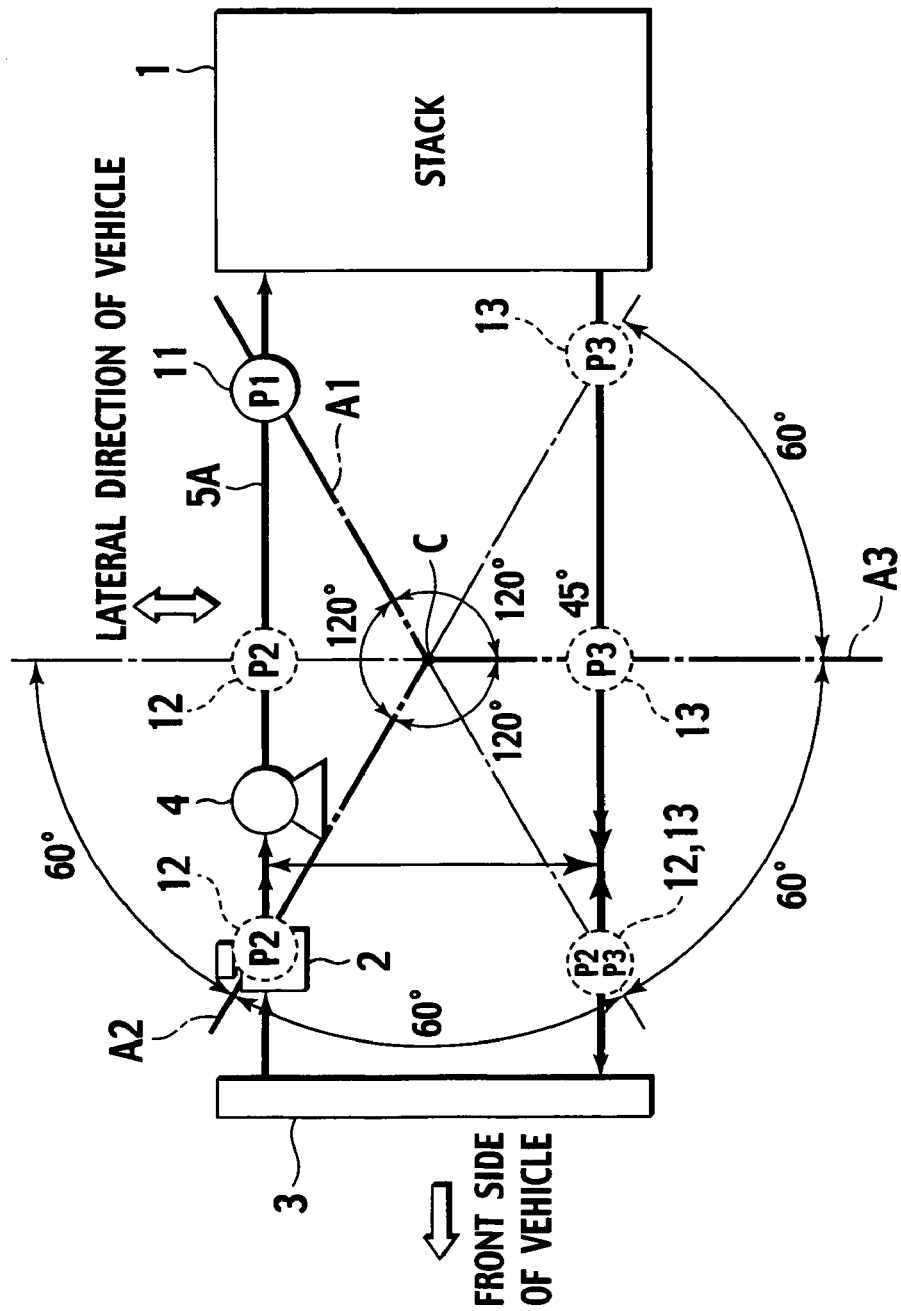
FIG. 14 is a schematic view showing attachment positions of three pressure sensors according to a seventh embodiment.

FIG. 14 shows attachment positions of pressure sensors in the seventh embodiment as well as an example where the number n of the pressure sensors is three (n=3).

In this embodiment, the center point C represents a point reflecting on a horizontal plane a position of the center of gravity of the total amount of cooling water which flows through a cooling water piping route 5A, and this center point C is used as a base point. In this embodiment, the center point C is divided into three equal parts by axis lines and one of the axis lines is set as the axis line of the reference pressure sensor. In such a case, the rest of two pressure sensors are positioned within angle ranges of ±360/2n degrees about the other two axis lines, respectively. Here, the reference pressure sensor serves as a reference in deciding positions of the respective pressure sensors and can be set arbitrarily.

Positions of three pressure sensors (n=3) are described. As shown in FIG. 14, where the center point C is divided into three equal parts by axis lines A1, A2 and A3, and the axis line A1 is set as the axis line of the reference pressure sensor 11, the sensors 12 is positioned within an angle range of ±60 degrees about the axis line A2, and the pressure sensor 13 is positioned within an angle range of ±60 degrees about the axis line A3. In FIG. 14, the pressure sensors 12 and 13 are depicted by a broken line, indicating that the pressure sensors 12 and 13 may be positioned within the angle ranges of ±60 degrees about the axis lines A2 and A3, respectively.

A process for reading pressure values from the pressure sensors 11, 12 and 13 positioned as above and determination of a pressure anomaly by the controller 6 are the same as those in the flowchart of FIG. 12 described earlier. Since three pressure sensors are provided in this embodiment, it is determined, in step S14 in FIG. 12, whether pressure values detected by at least two pressure sensors are predetermined preliminary anomaly values or greater, respectively. Where one of the pressure values is the corresponding preliminary anomaly value or greater, the controller 6 determines that there is a pressure anomaly of cooling water in step S15 and then executes a process for stopping the fuel cell system in step S16. Where both the pressure values are smaller than the preliminary anomaly values in step S14, process proceeds to step S17. In Step S17, it is determined whether the pressure values detected by at least two pressure sensors are predetermined preliminary anomaly values or greater, respectively. Where one of the values is the corresponding preliminary anomaly value or greater, the process proceeds to step S18, and the pressure values detected by at least two pressure sensors are used to calculate an added value or an average value as an pressure calculated value.

As described so far, in this embodiment, three pressure sensors are positioned at substantially opposite sides to each other about the center point C serving as a base point of a cooling water piping route. In addition, a pressure anomaly is determined by comparing an anomaly value to an added value or an average value of pressure values detected by at least two pressure sensors. This makes it possible to measure pressure more accurately for longitudinal or lateral acceleration of a vehicle, in comparison with a case where a pressure value is detected by a single pressure sensor. In other words, in this embodiment, even if a pressure value from one of the pressure sensors is large due to acceleration G in one direction, the controller 6 does not determine the value as a pressure anomaly as long as an added value or an average value of the pressure values from both pressure sensors is smaller than the anomaly value. Hence, pressure variation, caused by longitudinal and lateral acceleration of a vehicle, is not erroneously determined as excessive pressure. This prevents a problem that the controller 6 stops the stack when a vehicle turns suddenly at high speed or runs a rough road, even though there is no substantial pressure anomaly.

Further, in the present invention, the controller 6 determines that there is a pressure anomaly when a pressure calculated value, obtained based upon pressure values from the respective pressure sensors, exceeds the anomaly value for a predetermined period of time or longer. Therefore, pressure variation for a short period of time due to longitudinal and lateral acceleration of a vehicle is not determined as excessive pressure erroneously, and only pressure variation caused by some abnormality is determined as a pressure anomaly. Accordingly, the stack can be driven at the highest possible allowable pressure without causing any damage to the stack.

Furthermore, in this embodiment, the controller 6 determines that there is a pressure anomaly when one of pressure values detected by at least two pressure sensors is above the preliminary anomaly value. Therefore, the controller 6 can determine swiftly that there is a pressure anomaly if a pressure level increases excessively in a short period of time.

EIGHTH EMBODIMENT

Next, as the eighth embodiment, an example is described where the ranges of attachment positions of pressure sensors described in the seventh embodiment are further limited.

Figure 15:
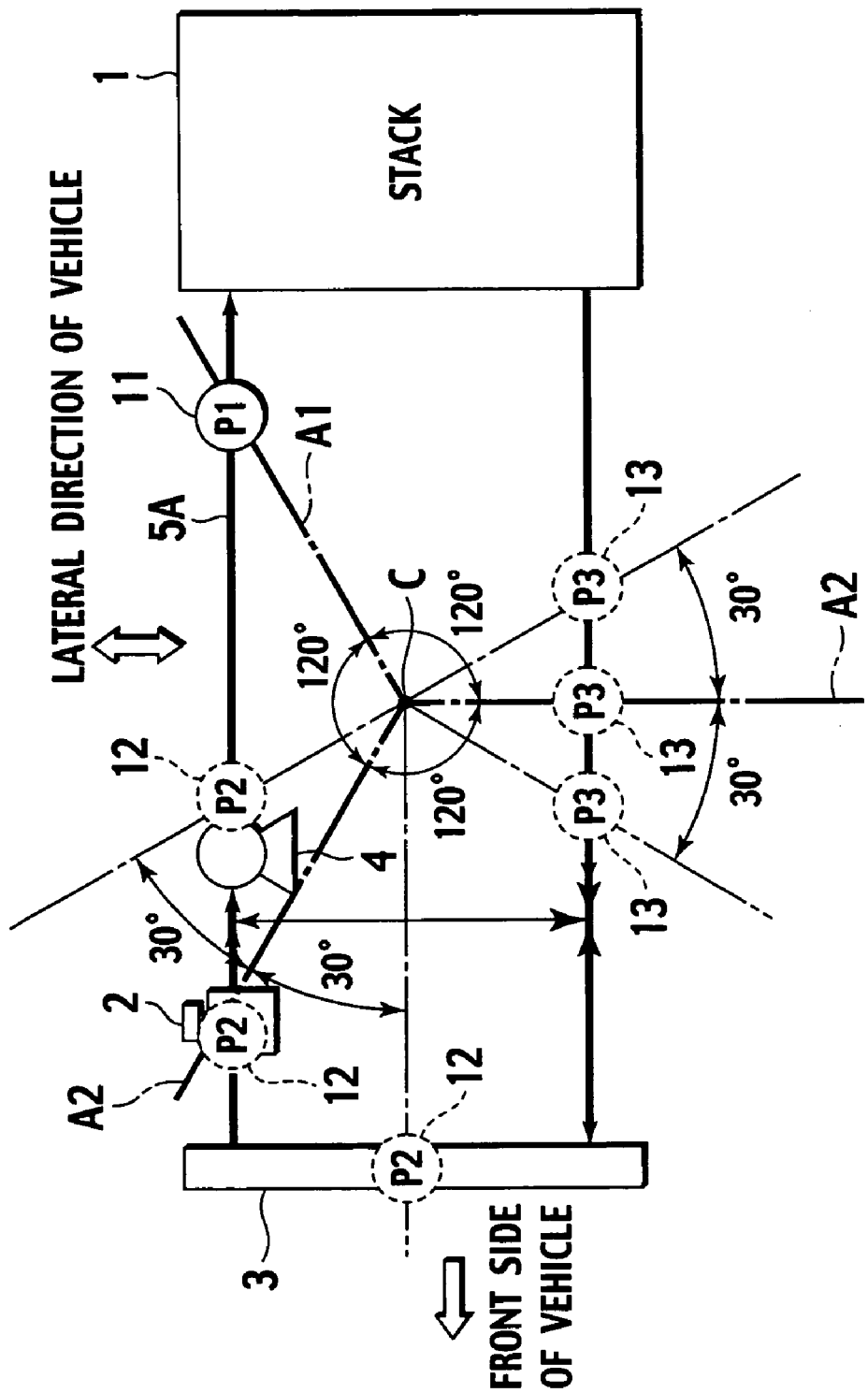
FIG. 15 is a schematic view showing attachment positions of three pressure sensors according to an eighth embodiment.

FIG. 15 shows attachment positions of pressure sensors in the eighth embodiment as well as an example where the number n of pressure sensors is three (n=3), which is the same as the seventh embodiment.

In this embodiment, the center point C represents a point reflecting on a horizontal plane a position of the center of gravity of the total amount of cooling water which flows through a cooling water piping route 5A, and this center points C is divided into three equal parts by axis lines. Where one of the axis lines is set as the axis line of the reference pressure sensor, the rest of pressure sensors are positioned within angle ranges of ±360/4n degrees about the other two axis lines, respectively. Here, the reference pressure sensor serves as a reference in deciding positions of the pressure sensors and can be set arbitrarily.

Positions of three pressure sensors (n=3) are described. As shown in FIG. 15, the center point C 5 is divided into three equal parts by axis lines A1, A2 and A3, and the axis lines A1 is set as the axis line of the reference pressure sensor 11. In such a case, the sensors 12 is positioned within an angle range of ±30 degrees about the axis line A2, and the pressure sensor 13 is positioned within an angle range of ±30 degrees about the axis line A3. In FIG. 15, the pressure sensors 12 and 13 are depicted by a broken line, indicating that the pressure sensors 12 and 13 may be positioned within the angle ranges of ±30 degrees about the axis lines A2 and A3, respectively.

According to the construction of this embodiment, since the rest of two pressure sensors are positioned more appropriately relative to the reference pressure sensor, pressure can be measured even more accurately than the seventh embodiment.

NINTH EMBODIMENT

Figure 16:
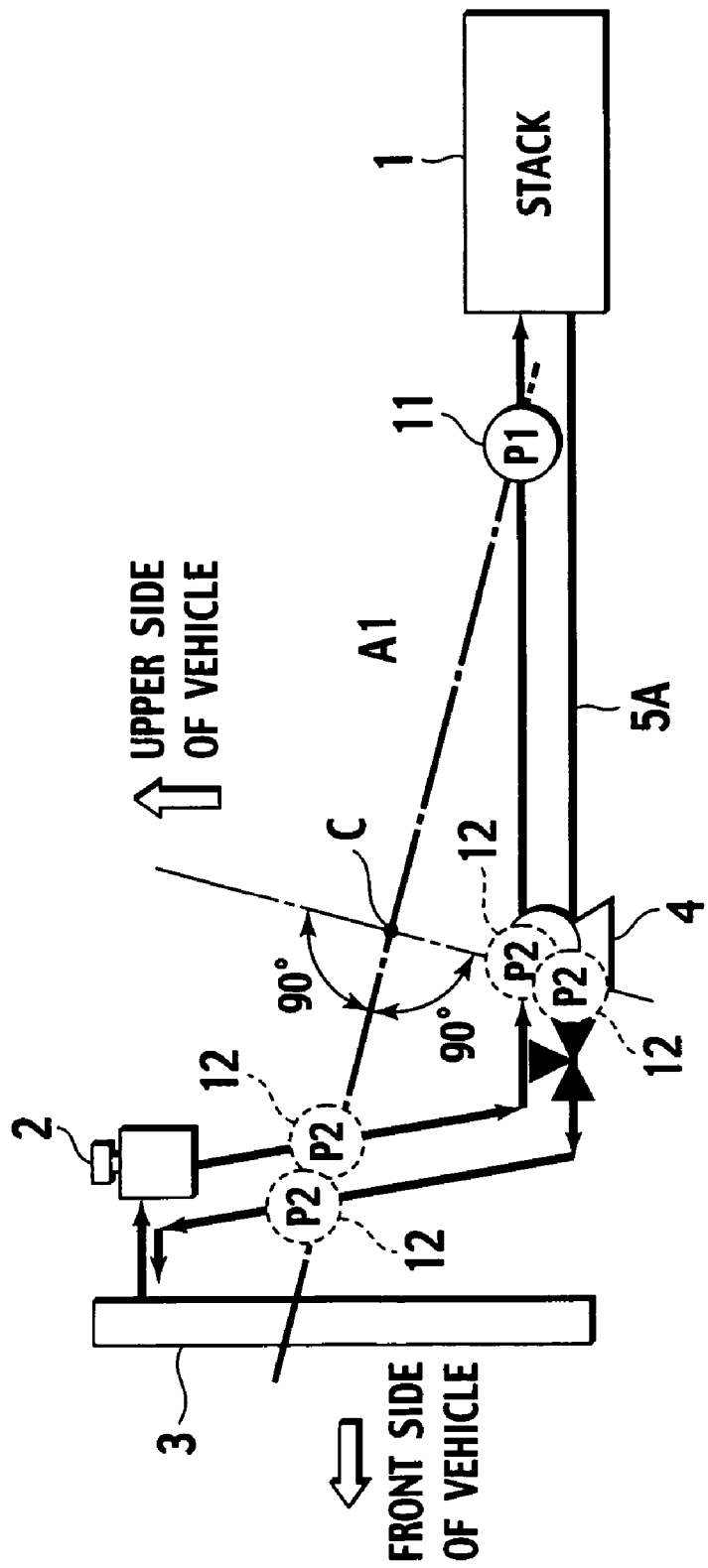
FIG. 16 is a schematic view showing a cooling water supply cycle and attachment positions of pressure sensors in a fuel cell system according to a ninth embodiment.

FIG. 16 shows a cooling water supply cycle and attachment positions of pressure sensors in a fuel cell system according to the ninth embodiment, and is a side view of the construction of a cooling water piping route. In FIG. 16, parts equivalent to those in FIG. 1 are designated by the same reference numerals. Further, the controller 6 and peripherals shown in FIG. 1 are not illustrated.

In this embodiment, a pair of pressure sensors 11 and 12 is provided, and a line passing from the reference pressure sensor 11 through the center point C is set as an axis line A1. In this case, the other pressure sensor 12 is positioned on the opposite side of the pressure sensor 11 about the center point C in the drawing and within an angle change of ±90 degrees about the angle line A1. Here, the center point C represents a point reflecting on a vertical plane a position of the center of gravity of the total amount of cooling water which flows through the cooling water piping route 5A. The pressure sensors 11 and 12 are provided at substantially opposite sides to each other about the center point C which serves as a base point. Further, the reference pressure sensor 11 serves as a reference in deciding positions of the respective pressure sensors and can be set arbitrarily.

In FIG. 16, two parallel arrows represent a supply route and a return route of cooling water, respectively. The cooling water piping route 5A in this embodiment is not provided in an upper part of a vehicle. Therefore, the pressure sensor 12 is not positioned within a range of 90 degrees in the upper part of the vehicle above the axis line A1. As depicted by a broken line in the drawing, the pressure sensor 12 is only provided within a range of 90 degrees in the lower part of the vehicle below the axis line A1.

In this embodiment, a process for the controller 6 to determine a pressure anomaly of cooling water using pressure values detected by a pair of pressure sensors 11 and 12 are the same as those of the flowchart shown in FIG. 12, and the description thereof is thus omitted.

In this embodiment, a pair of pressure sensors is positioned at substantially opposite sides to each other about a base point, which is the center point C set in the cooling water piping route. In addition, presence of a pressure anomaly is determined by comparing an anomaly value to an added value or an average value of pressure values detected by the respective pressure sensors. Therefore, it becomes possible to measure pressure more accurately irrespective of driving conditions of a vehicle, in comparison with a case where a pressure value is detected by a single pressure sensor. In other words, in this embodiment, even if a pressure value from one of the pressure sensors is large due to acceleration G in one direction, the controller 6 does not determine the value as a pressure anomaly as long as an added value or an average value of the pressure values from both pressure sensors is smaller than the anomaly value. Hence, pressure variation, caused by vertical, longitudinal and lateral acceleration of a vehicle, is not erroneously determined as excessive pressure. This prevents a problem that the controller 6 stops the stack when a vehicle turns suddenly at high speed or runs a rough road, even though there is no substantial pressure anomaly.

Further, in the present invention, the controller 6 determines that there is a pressure anomaly when a pressure calculated value, obtained based upon pressure values from the respective pressure sensors, exceeds the anomaly value for a predetermined period of time or longer. Therefore, pressure variation for a short period of time due to acceleration G in one direction of a vehicle is not determined as excessive pressure erroneously, and only pressure variation caused by some abnormality is determined as a pressure anomaly. Accordingly, the stack can be driven at the highest possible allowable pressure without causing any damage to the stack.

Furthermore, in this embodiment, the controller 6 determines that there is a pressure anomaly when one of pressure values detected by at least two pressure sensors is above the preliminary anomaly value. Therefore, the controller 6 can determine swiftly that there is a pressure anomaly if a pressure level increases excessively in a short period of time.

TENTH EMBODIMENT

Next, as the tenth embodiment, an example is described where the ranges of attachment positions of pressure sensors described in the ninth embodiment are further limited. The construction of a cooling water supply cycle in the tenth embodiment and a process for the controller 6 to determine a pressure anomaly are the same as those in the ninth embodiment. Therefore, the description thereof is omitted.

Figure 17:
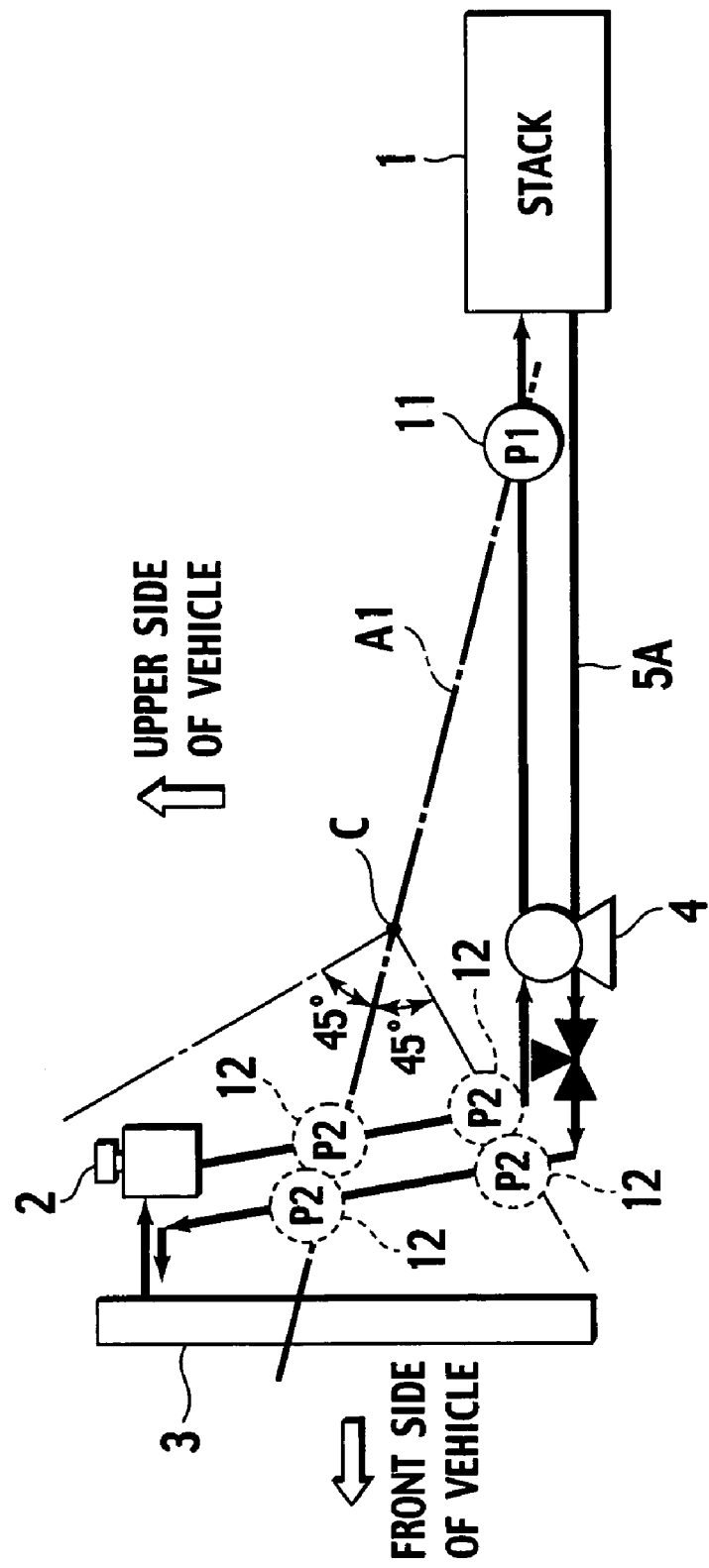
FIG. 17 is a schematic view showing attachment positions of two pressure sensors according to a tenth embodiment.

FIG. 17 shows attachment positions of pressure sensors according to the tenth embodiment. In this embodiment, a pair of pressure sensors 11 and 12 is provided, and a line passing from the reference pressure sensor 11 through the center point C is set as an axis line A1. In this case, the other pressure sensor 12 is positioned on the opposite side of the pressure sensor 11 about the center point C in the drawing and within an angle range of ±45 degrees about the axis line A1. In FIG. 17, the pressure sensors 12 are depicted by a broken line, indicating that the pressure sensor 12 may be positioned within the angle range of ±45 degrees about the axis line A1.

According to the construction of this embodiment, the other pressure sensor is positioned more appropriately relative to the reference pressure sensor. Therefore, pressure can be measured even more accurately than the ninth embodiment.

ELEVENTH EMBODIMENT

Next, as the eleventh embodiment, an example is described where the number n of pressure sensors in the ninth embodiment is now three. The construction of a cooling water supply cycle in the eleventh embodiment is the same as that of the ninth embodiment, and the description thereof is thus omitted.

Figure 18:
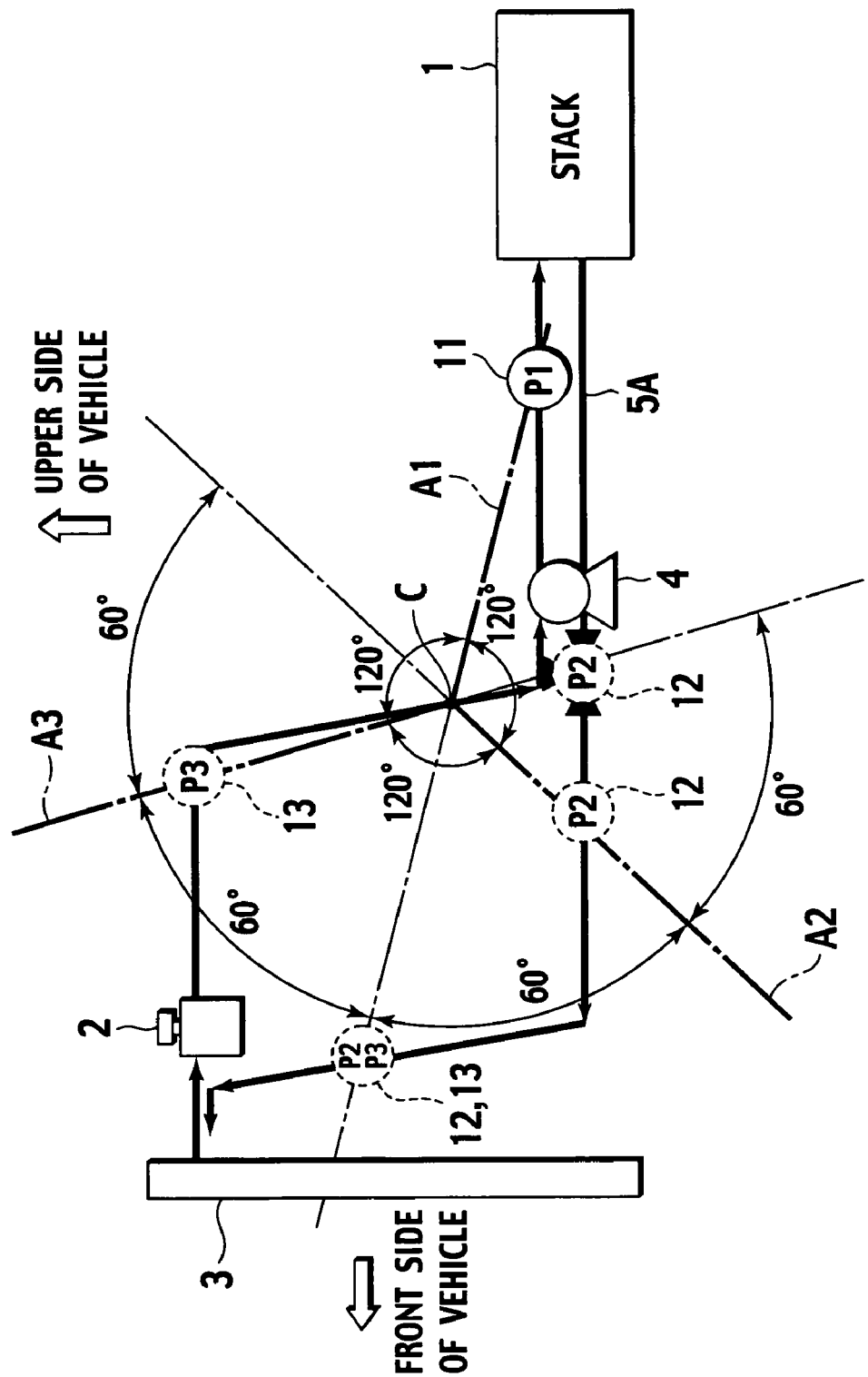
FIG. 18 is a schematic view showing attachment positions of three pressure sensors according to an eleventh embodiment.

FIG. 18 shows attachment positions of pressure sensors in the eleventh embodiment as well as an example where the number n of pressure sensors is three (n=3).

In this embodiment, the center point C reflects on a vertical plane a position of the center of gravity of the total amount of cooling water which flows through a cooling water piping route 5A, and this center point C serves as a base point. In this embodiment, the center point C is divided into three equal parts by axis lines and one of the axis lines is set as the axis line of a reference pressure sensor. In this case, the other pressure sensors are positioned within angle ranges of ±360/2n degrees about the other two axis lines, respectively. Here, the reference pressure sensor serves as a reference in deciding the respective pressure sensors and can be set arbitrarily.

Positions of the three pressure sensors (n=3) are described. As shown in FIG. 18, where the center point C is divided into three equal parts by axis lines A1, A2 and A3, the axis lines A1 is set as the axis line of the reference pressure sensor 11. In such a case, the sensors 12 is positioned within an angle range of ±60 degrees about the axis line A2, and the pressure sensor 13 is positioned within an angle range of ±60 degrees about the axis line A3. In FIG. 18, the pressure sensors 12 and 13 are depicted by a broken line, indicating that the pressure sensors 12 and 13 may be positioned within the angle ranges of ±60 degrees about the axis lines A2 and A3, respectively.

Note that the cooling water piping route 5A shown for this embodiment is provided in an upper-front part of a vehicle as shown in FIG. 18 but not in an upper-rear part of the same. Therefore, the pressure sensor 13 is not positioned in the upper-rear region of the vehicle beyond the axis line A3. As shown in the drawing by a broken line, the pressure sensor is provided within a range of 60 degrees in a region more front than the axis line A3 in a vehicle.

A process for reading pressure values from the pressure sensors 11, 12 and 13 positioned as described above and for determination of a pressure anomaly of cooling water by the controller 6 are the same as those of the flowchart shown in FIG. 12. Since three pressure sensors are provided in this embodiment, it is determined whether pressure values detected by at least two pressure values are predetermined preliminary anomaly values or greater, respectively. Where one of the pressure values is the corresponding anomaly value or greater, the controller 6 determines that there is a pressure anomaly of cooling water in step S15 and then executes a process for stopping the fuel cell system in step S16. Where both the pressure values are smaller than the anomaly values in step S14, the process proceed to step S17. Thereafter, in step S17, it is determined whether the pressure values detected by at least two pressure sensors are another predetermined preliminary anomaly values or greater, respectively. Where one of the pressure values is the corresponding anomaly value or greater, the process proceeds to step S18 and the pressure values from at least two pressure sensors are used to calculate an added value or average value as a pressure calculated value.

As described so far, in this embodiment, three pressure sensors are positioned at substantially opposite sides to each other using the center point C set in the cooling water piping route as a base point. In addition, presence of a pressure anomaly is determined by comparing an anomaly value to an added value or an average value of pressure values detected by at least two pressure sensors. Therefore, it becomes possible to measure pressure accurately irrespective of driving condition of a vehicle, in comparison with a case where a pressure value is detected by a single pressure sensor. In other words, in this embodiment, even if a pressure value from one of the pressure sensors is large due to acceleration G in one direction, the controller 6 does not determine the value as a pressure anomaly as long as an added value or an average value of the pressure values from both pressure sensors is smaller than the anomaly value. Hence, pressure variation, caused by vertical, longitudinal and lateral acceleration of a vehicle, is not erroneously determined as excessive pressure. This prevents a problem that the controller 6 stops the stack when a vehicle turns suddenly at high speed or runs a rough road, even though there is no substantial pressure anomaly.

Further, in the present invention, the controller 6 determines that there is a pressure anomaly when a pressure calculated value, obtained based upon pressure values from the respective pressure sensors, exceeds the anomaly value for a predetermined period of time or longer. Therefore, pressure variation for a short period of time due to vertical, longitudinal and lateral acceleration of a vehicle is not determined as excessive pressure erroneously, and only pressure variation caused by some abnormality is determined as a pressure anomaly. Accordingly, the stack can be driven at the highest possible allowable pressure without causing any damage to the stack.

Furthermore, in this embodiment, the controller 6 determines that there is a pressure anomaly when one of pressure values detected by two pressure sensors is above the preliminary anomaly value. Therefore, the controller 6 can determine swiftly that there is a pressure anomaly if a pressure level increases excessively in a short period of time.

TWELFTH EMBODIMENT

Next, as the twelfth embodiment, an example is described where the ranges of attachment positions described in the eleventh embodiment are further limited.

Figure 19:
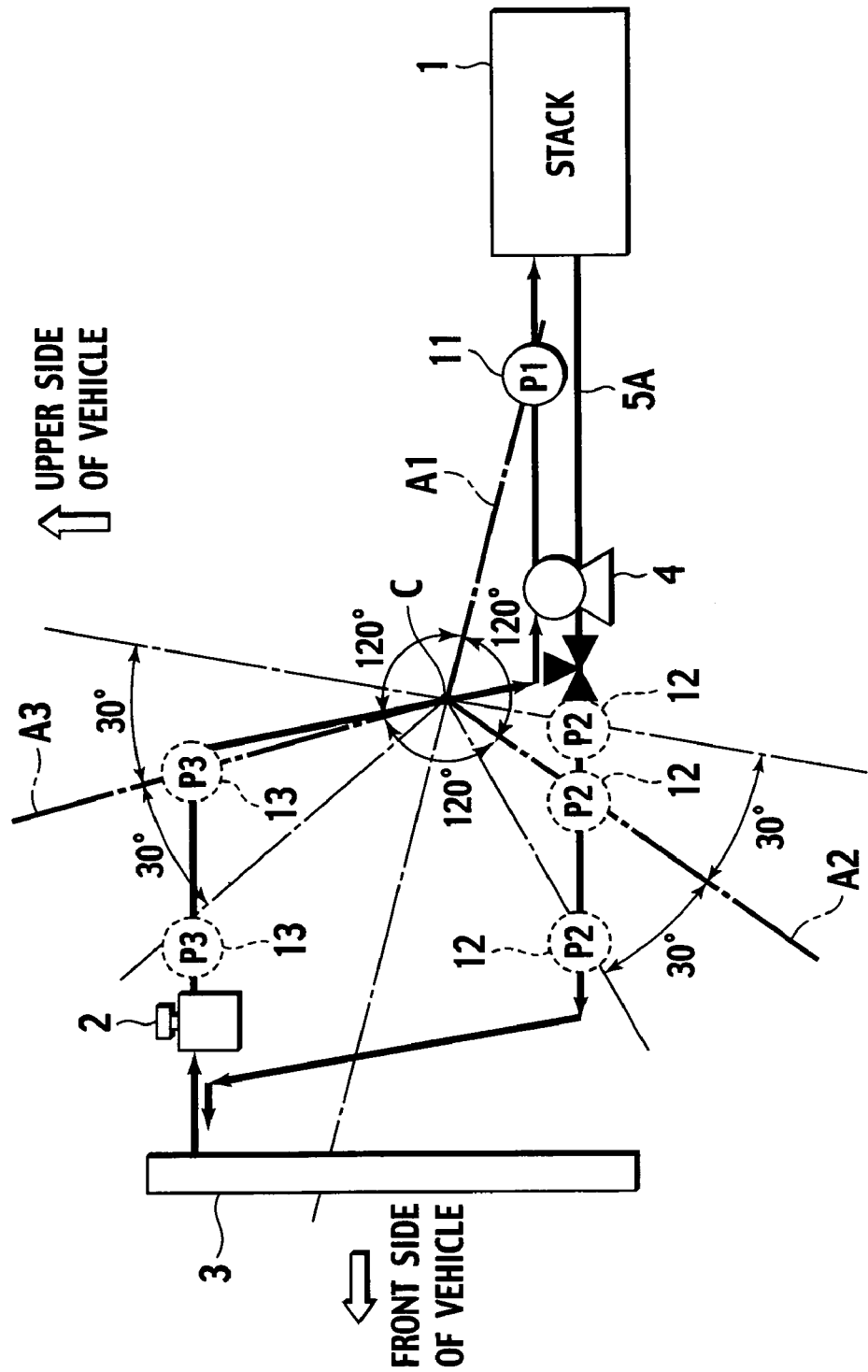
FIG. 19 is a schematic view showing attachment positions of three pressure sensors according to a twelfth embodiment.

FIG. 19 shows attachment positions of pressure sensors in the twelfth embodiment as well as an example where the number n of the pressure sensors is three (n=3), which is the same as the eleventh embodiment.

In this embodiment, the center point C represents a point reflecting on a vertical plane a position of the center of gravity of the total amount of cooling water which flow through a cooling water piping route 5A, and this center point C serves as a base point. In this embodiment, the center point C is divided into three equal parts by axis lines and one of the axis lines is set as the axis line of the reference pressure sensor. In this case, the other two pressure sensors are positioned within angle ranges of ±360/4n degrees about the other two axis lines, respectively. Here, the reference pressure sensor serves as a reference in deciding positions of the pressure sensors and can be set arbitrarily.

Positions of the three pressure sensors (n=3) are described. As shown in FIG. 19, where the center point C is divided into three equal parts by axis lines A1, A2 and A3, the axis lines A1 is set as the axis line of the reference pressure sensor 11. In this case, the sensor 12 is positioned within an angle range of ±30 degrees about the axis line A2, and the pressure sensor 13 is positioned within an angle range of ±30 degrees about the axis line A3. In FIG. 19, the pressure sensors 12 and 13 are depicted by a broken line, indicating that the pressure sensors 12 and 13 may be positioned within the angle ranges of ±30 degrees about the axis lines A2 and A3, respectively. In the construction of the present invention, however, the cooling water piping route 5 is not provided in an upper-rear part of a vehicle. Therefore, the pressure sensor 13 is not positioned in an upper-rear range of the vehicle beyond the axis line A3. As depicted in a broken line in the drawing, the pressure sensor 13 is positioned in a range of 30 degrees on the front side of a vehicle from the axis line A3.

According to the construction of this embedment, the other two pressure sensors are positioned more appropriately relative to the reference pressure sensor. Therefore, it becomes possible to measure pressure even more accurately than the eleventh embodiment.

The foregoing embodiments show examples where the present invention is applied to cooling water supply cycles. However, the present invention may also be applied to a water supply cycle for supplying humidifier water to a stack.

The entire content of a Japanese Patent Application No. P2004-215807 with a filing date of Jul. 23, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A fuel cell system mounted on a vehicle, the system comprising:
   a fuel cell stack:
   a water supply cycle comprising:
      a piping;
      a cooling water pump which supplies the cooling water to the fuel cell stack; and
      a radiator which performs heat exchange between a cooling water and a cooling air,
      wherein the fuel cell stack, the cooling water pump and the radiator are connected to each other by the piping;
   n numbers of pressure detectors provided on the piping and detecting pressure of the cooling water, the n being an even number of two or greater, wherein if a center point of a cross-section of the piping is divided into n numbers of equal parts by axis lines and one of the axis lines is set as an axis line of a reference pressure detector, the other pressure detector is provided within an angle range of ±360/2n degrees about the other axis line, and wherein the pressure detectors are placed in a position where pressure variation of the cooling water in the piping is caused by lateral acceleration, longitudinal acceleration, or vertical acceleration of the vehicle; and
   a controller which determines a pressure anomaly of the cooling water within the piping by comparing a predetermined anomaly value to an added value or an average value of pressure values detected by the n numbers of pressure detectors, wherein when the controller determines that there is the pressure anomaly of the cooling water in the piping, the controller controls the cooling water pump to stop supply of the cooling water to the fuel cell stack.

2. The fuel cell system of claim 1, wherein the other pressure detector is provided within an angle range of ±360/4n degrees about the other axis line.

3. The fuel cell system of claim 1, wherein the reference pressure detector is provided in a gravitational direction from the center point.

4. The fuel cell system of claim 1, wherein the controller determines that there is a pressure anomaly when the pressure calculated value is above the anomaly value for a predetermined period of time or longer.

5. The fuel cell system of claim 4, wherein the controller determines that there is a pressure anomaly when any of pressure values detected by the two pressure detectors is above a predetermined preliminary anomaly value.

6. A fuel cell system mounted on a vehicle, the system comprising:
   a fuel cell stack;
   a water supply cycle comprising:
      a piping;
      a cooling water pump which supplies the cooling water to the fuel cell stack; and
      a radiator which performs heat exchange between a cooling water and a cooling air,
      wherein the fuel cell stack, the cooling water pump and the radiator are connected to each other by the piping;
   n numbers of pressure detectors provided on the piping and detecting pressure of the cooling water, the n being an odd number of three or greater, wherein if a center point of the piping is divided into n numbers of equal parts by axis lines and one of the axis lines is set as an axis line of a reference pressure detector, the other pressure detectors are provided within angle ranges of ±360/2n degrees about the other axis lines, respectively, and wherein the pressure detectors are placed in a position where pressure variation of the cooling water in the piping is caused by lateral acceleration, longitudinal acceleration, or vertical acceleration of the vehicle; and
   a controller which determines a pressure anomaly of the cooling water within the piping by comparing a predetermined anomaly value to an added value or an average value of pressure values detected by at least two of the pressure detectors, wherein when the controller determines that there is the pressure anomaly of the cooling water in the piping, the controller controls the cooling water pump to stop supply of the cooling water to the fuel cell stack.

7. The fuel cell system of claim 6, wherein the other pressure detector is provided within an angle range of ±360/4n degrees about the other axis line.

8. The fuel cell system of claim 6, wherein the controller determines that there is a pressure anomaly when the pressure calculated value is above the anomaly value for a predetermined period of time or longer.

9. The fuel cell system of claim 8, wherein the controller determines that there is a pressure anomaly when any of pressure values detected by at least two of the pressure detectors is above a predetermined preliminary anomaly value.

10. A fuel cell system mounted on a vehicle, the system comprising:
    a fuel cell stack;
    a water supply cycle comprising:
       a piping;

a cooling water pump which supplies the cooling water to the fuel cell stack; and a radiator which performs heat exchange between a cooling water and a cooling air, wherein the fuel cell stack, the cooling water pump and the radiator are connected to each other by the piping;

two pressure detectors provided on a piping route and detecting pressure of the cooling water, wherein if a point reflecting on a horizontal plane of the vehicle a position of center of gravity of a total amount of the cooling water flowing through the piping route is set as a center point, and a line passing from one of the pressure detectors, which serves as a reference pressure detector, through the center point is set as an axis line, the other pressure detector is provided within an angle range of ±90 degrees about the axis line, and wherein the pressure detectors are placed in a position where pressure variation of the cooling water in the piping is caused by lateral acceleration, longitudinal acceleration, or vertical acceleration of the vehicle; and a controller which determines a pressure anomaly of the cooling water within the piping by comparing a predetermined anomaly value to an added value or an average value of pressure values detected by the two pressure detectors, wherein when the controller determines that there is the pressure anomaly of the cooling water in the piping, the controller controls the cooling water pump to stop supply of the cooling water to the fuel cell stack.

11. The fuel cell system of claim 10, wherein the other pressure detector is provided within an angle range of ±45 degrees about the axis line.

12. The fuel cell system of claim 10, wherein the controller determines that there is a pressure anomaly when the pressure calculated value is above the anomaly value for a predetermined period of time or longer.

13. The fuel cell system of claim 12, wherein the controller determines that there is a pressure anomaly when any of pressure values detected by the two pressure detectors is above a predetermined preliminary anomaly value.

14. A fuel cell system mounted on a vehicle, the system comprising:
a fuel cell stack;
a water supply cycle comprising:
a piping;
a cooling water pump which supplies the cooling water to the fuel cell stack; and
a radiator which performs heat exchange between a cooling water and a cooling air,
wherein the fuel cell stack, the cooling water pump and the radiator are connected to each other by the piping;
n numbers of pressure detectors provided on a piping route and detecting pressure of the cooling water, the n being an odd number of three or greater, wherein if a point reflecting on a horizontal plane of the vehicle a position of center of gravity of a total amount of the cooling water flowing through the piping route is set as a center point, and the center point is divided into n numbers of equal parts by axis lines, one of which is set as an axis line of a reference pressure detector, the other pressure detectors are provided within angle ranges of ±360/2n degrees about the other axis lines, respectively, and wherein the pressure detectors are placed in a position where pressure variation of the cooling water in the piping is caused by lateral acceleration, longitudinal acceleration, or vertical acceleration of the vehicle; and
a controller which determines a pressure anomaly of the cooling water within the piping by comparing a predetermined anomaly value to an added value or an average value of pressure values detected by at least two pressure detectors, wherein when the controller determines that there is the pressure anomaly of the cooling water in the piping, the controller controls the cooling water pump to stop supply of the cooling water to the fuel cell stack.

15. The fuel cell system of claim 14, wherein the other pressure detectors are provided within angle ranges of ±360/4n degrees about the other axis lines, respectively.

16. The fuel cell system of claim 14, wherein the controller determines that there is a pressure anomaly when the pressure calculated value is above the anomaly value for a predetermined period of time or longer.

17. The fuel cell system of claim 16, wherein the controller determines that there is a pressure anomaly when any of pressure values detected by at least two of the pressure detectors is above a predetermined preliminary anomaly value.

18. A fuel cell system mounted on a vehicle, the system comprising:
a fuel cell stack;
a water supply cycle comprising:
a piping;
a cooling water pump which supplies the cooling water to the fuel cell stack; and
a radiator which performs heat exchange between a cooling water and a cooling air,
wherein the fuel cell stack, the cooling water pump and the radiator are connected to each other by the piping;
two pressure detectors provided on a piping route and detecting pressure of the cooling water, wherein if a point reflecting on a vertical plane of the vehicle a position of center of gravity of a total amount of the cooling water flowing through the piping route is set as a center point, and a line passing from one of the pressure detectors, which serves as a reference pressure detector, through the center point is set as an axis line, the other pressure detector is provided within an angle range of ±90 degrees about the axis line and wherein the pressure detectors are placed in a position where pressure variation of the cooling water in the piping is caused by lateral acceleration, longitudinal acceleration, or vertical acceleration of the vehicle; and
a controller which determines a pressure anomaly of the cooling water within the piping by comparing a predetermined anomaly value to an added value or an average value of pressure values detected by the two pressure detectors, wherein when the controller determines that there is the pressure anomaly of the cooling water in the piping, the controller controls the cooling water pump to stop supply of the cooling water to the fuel cell stack.

19. The fuel cell system of claim 18, wherein the other pressure detector is provided within an angle range of ±45 degrees about the axis line.

20. The fuel cell system of claim 18, wherein the controller determines that there is a pressure anomaly when the pressure calculated value is above the anomaly value for a predetermined period of time or longer.

21. The fuel cell system of claim 20, wherein the controller determines that there is a pressure anomaly when any of pressure values detected by the two pressure detectors is above a predetermined preliminary anomaly value.

22. A fuel cell system, mounted on a vehicle, the system comprising:
a fuel cell stack;
a water supply cycle comprising:
a piping;

a cooling water pump which supplies the cooling water to the fuel cell stack; and a radiator which performs heat exchange between a cooling water and a cooling air, wherein the fuel cell stack, the cooling water pump and the radiator are connected to each other by the piping;

n numbers of pressure detectors provided on the piping route and detecting pressure of the cooling water, the n being an odd number of three or greater, wherein if a point reflecting on a vertical plane a position of center of gravity of a total amount of the cooling water flowing through the piping route is set as a center point, and the center point is divided into n numbers of equal parts by axis lines, one of which is set as an axis line of a reference pressure detector, the other pressure detectors are provided within angle ranges of ±360/2n degrees about the other axis lines, respectively, and wherein the pressure detectors are placed in a position where pressure variation of the cooling water in the piping is caused by lateral acceleration, longitudinal acceleration, or vertical acceleration of the vehicle; and a controller which determines a pressure anomaly of the cooling water within the piping by comparing a predetermined anomaly value to an added value or an average value of pressure values detected by at least two pressure detectors, wherein when the controller determines that there is the pressure anomaly of the cooling water in the piping, the controller controls the cooling water pump to stop supply of the cooling water to the fuel cell stack.

23. The fuel cell system of claim 18, wherein the other pressure detectors are provided within angle ranges of ±360/4n degrees about the other axis lines, respectively.

24. The fuel cell system of claim 18, wherein the controller determines that there is a pressure anomaly when the pressure calculated value is above the anomaly value for a predetermined period of time or longer.

25. The fuel cell system of claim 20, wherein the controller determines that there is a pressure anomaly when any of pressure values detected by at least two of the pressure detectors is above a predetermined preliminary anomaly value.

26. A fuel cell system mounted on a vehicle, the system comprising:
a fuel cell stack;
a water supply cycle comprising:
a piping;
a cooling water pump which supplies the cooling water to the fuel cell stack; and
a radiator which performs heat exchange between a cooling water and a cooling air,
wherein the fuel cell stack, the cooling water pump and the radiator are connected to each other by the piping;
n numbers of pressure detection means for detecting pressure of the cooling water, which are provided on the piping, the n being an even number of two or greater, wherein if a center point of a cross-section of the piping is divided into n numbers of equal parts by axis lines and one of the axis lines is set as an axis line of reference pressure detection means, the other pressure detection means is provided within an angle range of ±360/2n degrees about the other axis line, and wherein the pressure detection means are placed in a position where pressure variation of the cooling water in the piping is caused by lateral acceleration, longitudinal acceleration or vertical acceleration of the vehicle; and
control means for determining a pressure anomaly of the cooling water within the piping by comparing a predetermined anomaly value to an added value or an average value of pressure values detected by the n numbers of pressure detection means, wherein when the control means determines that there is the pressure anomaly of the cooling water in the piping, the control means controls the cooling water pump to stop supply of the cooling water to the fuel cell stack.

27. A fuel cell system mounted on a vehicle, the system comprising:
a fuel cell stack;
a water supply cycle comprising:
a piping;
a cooling water pump which supplies the cooling water to the fuel cell stack; and
a radiator which performs heat exchange between a cooling water and a cooling air,
wherein the fuel cell stack, the cooling water pump and the radiator are connected to each other by the piping;
two pressure detection means for detecting pressure of the cooling water, which are provided on a piping route, wherein if a point reflecting on a horizontal plane of the vehicle a position of center of gravity of a total amount of the cooling water flowing through the piping route is set as a center point, and a line passing from one of the pressure detection means, which serves as reference pressure detection means, through the center point is set as an axis line, the other pressure detection means is provided within an angle range of ±90 degrees about the axis line, and wherein the pressure detection means are placed in a position where pressure variation of the cooling water in the piping is caused by lateral acceleration, longitudinal acceleration, or vertical acceleration of the vehicle; and
control means for determining a pressure anomaly of the cooling water within a piping by comparing a predetermined anomaly value to an added value or an average value of pressure values detected by the n numbers of pressure detection means, wherein when the control means determines that there is the pressure anomaly of the cooling water in the piping, the control means controls the cooling water pump to stop supply of the cooling water to the fuel cell stack.

28. A fuel cell system mounted on a vehicle, the system comprising:
a fuel cell stack;
a water supply cycle comprising:
a piping;
a cooling water pump which supplies the cooling water to the fuel cell stack; and
a radiator which performs heat exchange between a cooling water and a cooling air,
wherein the fuel cell stack, the cooling water pump and the radiator are connected to each other by the piping;
two pressure detection means for detecting pressure of the cooling water, which are provided on a piping route, wherein if a point reflecting on a vertical plane of the vehicle a position of center of gravity of a total amount of the cooling water flowing through the piping route is set as a center point, and a line passing from one of the pressure detection means, which serves as reference pressure detection means, through the center point is set as an axis line, the other pressure detection means is provided within an angle range of ±90 degrees about the axis line, and wherein the pressure detection means are placed in a position where pressure variation of the cooling water in the piping is caused by lateral acceleration, longitudinal acceleration, or vertical acceleration of the vehicle; and control means for determining a pressure anomaly of the cooling water within a piping by comparing a predetermined anomaly value to an added value or an average value of pressure values detected by the two pressure detection means, wherein when the control means determines that there is the pressure anomaly of the cooling water in the piping, the control means controls the cooling water pump to stop supply of the cooling water to the fuel cell stack.

* * * * *